United States Patent
Korcz et al.

(10) Patent No.: US 10,897,127 B2
(45) Date of Patent: *Jan. 19, 2021

(54) ELECTRICAL BOX CABLE CLAMP

(71) Applicant: Hubbell Incorporated, Shelton, CT (US)

(72) Inventors: Krzysztof W. Korcz, Granger, IN (US); Steven J. Johnson, Buchanan, MI (US); Joseph Edward Richard, Walkerton, IN (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/296,660

(22) Filed: Mar. 8, 2019

(65) Prior Publication Data

US 2019/0207372 A1 Jul. 4, 2019

Related U.S. Application Data

(63) Continuation of application No. 15/372,155, filed on Dec. 7, 2016, now Pat. No. 10,263,404.

(60) Provisional application No. 62/264,015, filed on Dec. 7, 2015.

(51) Int. Cl.
*H02G 3/08* (2006.01)
*H02G 15/007* (2006.01)

(52) U.S. Cl.
CPC .......... *H02G 3/085* (2013.01); *H02G 15/007* (2013.01)

(58) Field of Classification Search
CPC .............................. H02G 3/085; H02G 15/007
USPC ........................................................ 174/64
See application file for complete search history.

(56) References Cited

U.S. PATENT DOCUMENTS

| | | | |
|---|---|---|---|
| 3,006,661 | A | 10/1961 | McNeill |
| 3,858,151 | A | 12/1974 | Paskert |
| 4,012,578 | A | 3/1977 | Moran et al. |
| 4,190,222 | A | 2/1980 | Appleton et al. |
| 4,277,641 | A | 7/1981 | Bauer |
| 4,299,363 | A | 11/1981 | Datschefski |
| 4,302,035 | A | 11/1981 | Ochwat |
| 4,361,302 | A | 11/1982 | Lass |
| 4,640,433 | A | 2/1987 | Jorgensen et al. |
| 4,880,387 | A | 3/1989 | Stikeleather et al. |
| 4,919,370 | A | 4/1990 | Martin |
| 5,118,057 | A | 6/1992 | Martin |
| 5,285,013 | A | 2/1994 | Schnell et al. |
| 5,374,017 | A | 12/1994 | Martin |
| 5,422,437 | A | 6/1995 | Schnell |
| 5,442,141 | A | 8/1995 | Gretz |
| 5,607,323 | A | 3/1997 | Foster et al. |

(Continued)

OTHER PUBLICATIONS

International Search Report and Written Opinion mailed in International PCT/US2016/065419 dated Mar. 2, 2017.

(Continued)

*Primary Examiner* — Angel R Estrada
(74) *Attorney, Agent, or Firm* — Wissing Miller LLP

(57) ABSTRACT

Electrical box assemblies, cable clamps and cable clamp assemblies are provided. The cable clamps include a base, cable guides, and clamping members that grip an electrical cable passing through the base. The electrical box assembly includes an electrical box, and a cable clamp or a cable clamp assembly. The cable clamp assemblies include dual cable clamps that can fit within pry-outs in an electrical box or that can be releasably secured to an electrical box adjacent pry-outs in an electrical box.

26 Claims, 36 Drawing Sheets

(56) References Cited

U.S. PATENT DOCUMENTS

| | | |
|---|---|---|
| 6,043,432 A | 3/2000 | Gretz |
| 6,080,933 A | 6/2000 | Gretz |
| 6,114,630 A | 9/2000 | Gretz |
| 6,143,982 A | 11/2000 | Gretz |
| 6,335,488 B1 | 1/2002 | Gretz |
| 6,380,483 B1 | 4/2002 | Blake |
| 6,604,400 B1 | 8/2003 | Gretz |
| 6,670,553 B1 | 12/2003 | Gretz |
| 6,682,355 B1 | 1/2004 | Gretz |
| 6,709,280 B1 | 3/2004 | Gretz |
| 6,780,029 B1 | 8/2004 | Gretz |
| 6,849,803 B1 | 2/2005 | Gretz |
| 7,211,744 B2 | 5/2007 | Jorgensen |
| 7,238,894 B1 | 7/2007 | Gretz |
| 7,304,251 B1 | 12/2007 | Gretz |
| 7,329,144 B1 | 2/2008 | Gretz |
| 7,495,184 B1 | 2/2009 | Gretz |
| 7,576,290 B1 | 8/2009 | Korcz |
| 7,645,947 B2 | 1/2010 | Kiely et al. |
| 7,824,213 B1 | 11/2010 | Korcz et al. |
| 8,124,891 B1 | 2/2012 | Gretz |
| 8,759,674 B2 | 6/2014 | Korcz et al. |
| 9,247,662 B2 | 1/2016 | Korcz et al. |
| 9,252,578 B2 | 2/2016 | Korcz et al. |
| 2006/0005988 A1 | 1/2006 | Jorgensen |
| 2006/0272142 A1 | 12/2006 | Johnson |
| 2007/0261881 A1 | 11/2007 | Wronski |
| 2008/0230267 A1 | 9/2008 | De la Borbolla |
| 2008/0296061 A1 | 12/2008 | Kerr, Jr. |
| 2009/0205865 A1 | 8/2009 | Korcz |
| 2013/0153265 A1 | 6/2013 | Chen |
| 2013/0233615 A1 | 9/2013 | Pimentel |
| 2014/0262486 A1 | 9/2014 | Korcz et al. |
| 2014/0262488 A1 | 9/2014 | Korcz et al. |
| 2015/0090488 A1 | 4/2015 | Laverdiere |
| 2015/0357806 A1 | 12/2015 | Korcz et al. |
| 2016/0099554 A1 | 4/2016 | Korcz et al. |
| 2016/0105011 A1 | 4/2016 | Korcz et al. |

OTHER PUBLICATIONS

Canadian Office Action mailed in corresponding CA3006301 dated May 1, 2020.
Arlington brochure "White Button (TM) Non-Metallic Cable Connectors", 2006, (2 pages).

ELECTRICAL BOX CABLE CLAMP

CROSS REFERENCE TO RELATED APPLICATIONS

This application is a continuation of co-pending application Ser. No. 15/372,155, filed Dec. 7, 2016, which claims priority to U.S. Provisional Application Ser. No. 62/264,015 filed Dec. 7, 2015 both of which are incorporated by reference herein in their entirety.

BACKGROUND

Field

The present disclosure relates generally to electrical box cable clamps, electrical box cable clamp assemblies, and to electrical box assemblies having such cable clamps and cable clamp assemblies installed within an electrical box.

Description of the Related Art

Electrical boxes are mounted in various residential, commercial, and industrial locations depending on the particular application. Electrical cables are commonly supplied to such electrical boxes which are used for connecting the cables to electrical devices or fixtures or other electrical cables. Current electrical codes typically require electrical cabling to be secured to the electrical boxes. In some electrical box configurations, the electrical cables generally pass through an opening in a wall of the electrical box, also known as a knock-out or pry-out, and are secured in place by a cable clamp. Conventional metallic cable clamps for non-metallic sheathed cabling generally clamp the cable between a movable clamping plate and a side wall or bottom wall of the electrical box, or between a movable clamping plate and a fixed clamping plate on the clamp.

SUMMARY

The present disclosure provides embodiments of electrical cable clamps. In one exemplary embodiment, the electrical cable clamp comprises a base, at least one cable guide member, and at least two clamp members. The base has a hollow center opening. The at least one cable guide member has a first end secured to the base and a second free end that extends at least partially into the hollow center opening of the base. Each of the at least two clamp members has a first end secured to the base, and a second free end that extends at least partially into the hollow center opening of the base. In this exemplary configuration, an area of the hollow center opening where the at least one cable guide member and at least two clamp members converge being a cable gripping area where the free ends of the at least two clamp members are shaped to flex imparting little resistance to the forward advancement of a cable within the gripping area, while imparting sufficient resistance to rearward movement of the cable to prevent easy withdrawal of the cable from the gripping area.

The present disclosure provides embodiments of electrical cable clamp assemblies. In one exemplary embodiment, an electrical cable clamp assembly comprises a first cable clamp and a second cable clamp that is coupled to the first cable clamp. In one exemplary embodiment, the first cable clamp comprises a first base having a hollow center opening, at least one first cable guide having a first end secured to the first base and a second free end that extends at least partially into the hollow center opening, and at least two first clamp members, each having a first end secured to the first base and a second free end that extends at least partially into the hollow center opening. In this exemplary configuration, an area of the hollow center of the body where the at least one first cable guide and at least two first clamp members converge being a cable gripping area where the free ends of the at least two first clamp members are shaped to flex imparting little resistance to the forward advancement of a cable within the gripping area, while imparting sufficient resistance to rearward movement of the cable to prevent withdrawal of the cable from the gripping area. In one exemplary embodiment, the second cable clamp comprises a second base having a hollow center opening, at least one second cable guide having a first end secured to the second base and a second free end that extends at least partially into the hollow center opening of the base, and at least two second clamp members, each having a first end secured to the second base and a second free end that extends at least partially into the hollow center opening of the base. In this exemplary configuration, an area of the hollow center opening of the base where the at least one second cable guide and at least two second clamp members converge being a cable gripping area where the free ends of the at least two second clamp members are shaped to flex imparting little resistance to the forward advancement of a cable within the gripping area, while imparting sufficient resistance to rearward movement of the cable to prevent withdrawal of the cable from the gripping area.

The present disclosure also provides electrical box assemblies. In one exemplary embodiment, an electrical box assembly comprises an electrical box, and at least one cable clamp. The electrical box has four sides and a bottom, and the at least one electrical cable clamp is releasably secured within the electrical box. In one exemplary configuration, the at least one electrical cable clamp comprises a base having a hollow center opening, at least one cable guide member having a first end secured to the base and a second free end that extends at least partially into the hollow center opening, and at least two clamp members, each having a first end secured to the base and a second free end that extends at least partially into the hollow center opening. In this exemplary configuration, an area of the hollow center opening in the base where the at least one cable guide member and at least two clamp members converge being a cable gripping area where the free ends of the at least two clamp members are shaped to flex imparting little resistance to the forward advancement of a cable within the gripping area, while imparting sufficient resistance to rearward movement of the cable to prevent easy withdrawal of the cable from the gripping area.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

Figure 1:
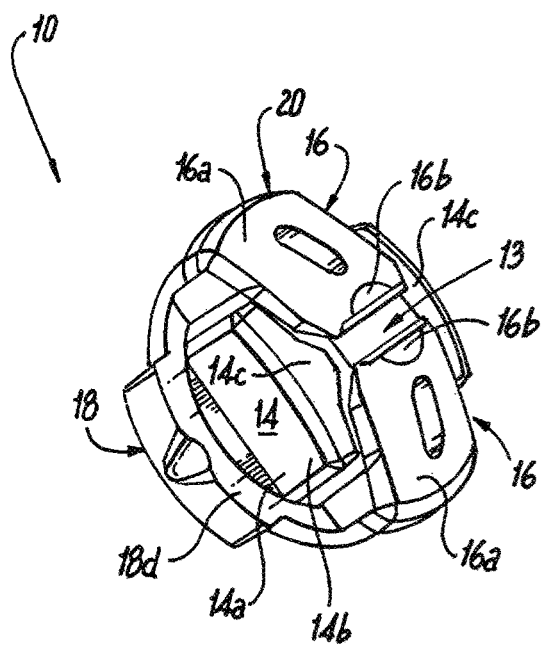
FIG. 1 is a front side perspective view of an exemplary embodiment of a cable clamp according to the present disclosure.
Figure 2:
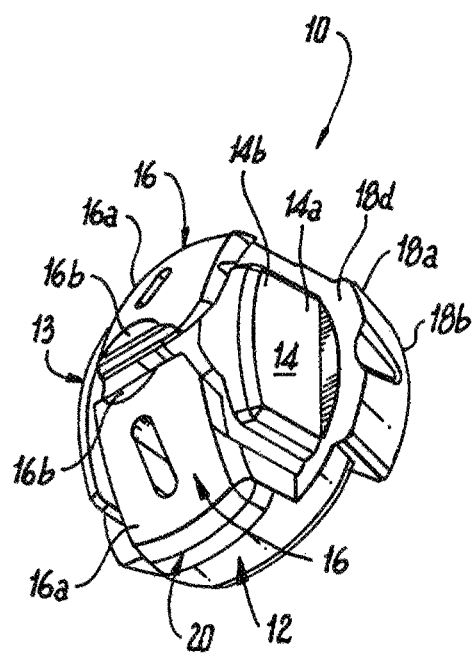
FIG. 2 is a front side perspective view of the cable clamp of FIG. 1, taken from an opposite side of the cable clamp of FIG. 1.
Figure 3:
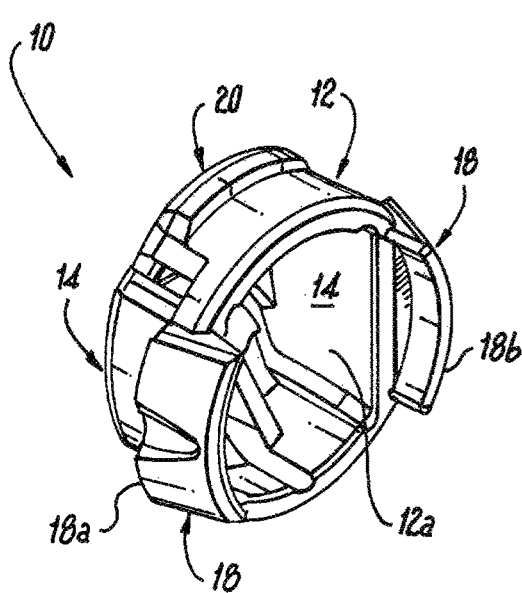
FIG. 3 is a rear side perspective view of the cable clamp of FIG. 1.
Figure 4:
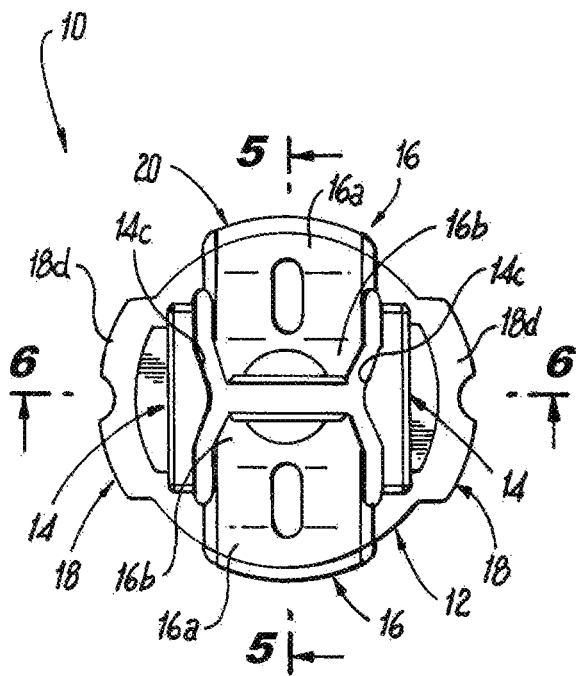
FIG. 4 is a front plan view of the cable clamp of FIG. 1.
Figure 5:
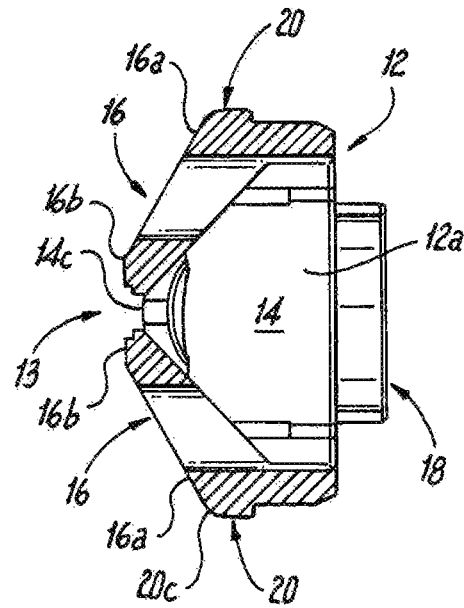
FIG. 5 is a cross-sectional view of the cable clamp of FIG. 4 taken along line 5-5.
Figure 6:
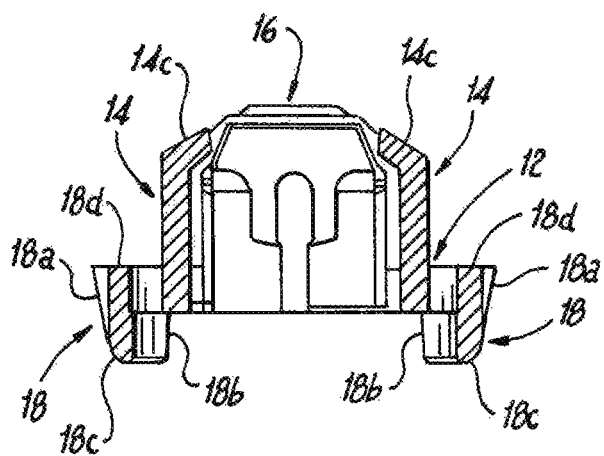
FIG. 6 is a cross-sectional view of the cable clamp of FIG. 4 taken along line 6-6.

The present disclosure provides descriptions of embodiments for cable clamps (also called clamps) and cable clamp assemblies used in electrical boxes to secure non-metallic sheath cabling within such electrical boxes. The present disclosure also provides descriptions of embodiments of electrical box assemblies that include electrical boxes with such cable clamps and/or cable clamp assemblies installed. The specification and drawings are to be regarded in an illustrative sense rather than a restrictive sense. Various modifications may be made thereto without departing from the spirit and scope of the present disclosure.

Referring to FIGS. 1-6, an exemplary embodiment of a cable clamp according to the present disclosure is shown. In this exemplary embodiment, the cable clamp 10 includes a base 12, a pair of cable guide members (also called "guides") 14, and a pair of cable clamp members (also called "fingers") 16 that are secured to the base and are capable of flexing relative to the base. The cable clamp 10 has a gripping area 13 where an electrical cable is gripped by the cable clamp 10 in such a way as to impart little resistance to the forward advancement of an electrical cable within the cable clamp 10, and to engage the electrical cable imparting sufficient resistance to rearward movement of the cable to prevent withdrawal of the cable from the cable clamp 10.

In this exemplary embodiment, the base 12 is circular in shape, and is configured to fit within a knock-out of an electrical box. The base 12 has a hollow center opening 12a sufficient to allow an electrical cable to pass through the cable clamp 10, as will be described in more detail below. The base 12 also includes one or more outside snap-in tabs 18 used to releasably secure the cable clamp 10 to an electrical box. In this exemplary embodiment, the one or more outside snap-in tabs 18 comprises two outside snap-in tabs that are positioned on the base 12, one adjacent to each guide 14. The outside snap-in tabs have a first end 18a secured to or integrally formed into the base 12, and a free end 18b that can extend away from the base. The outer edge of the outside snap-in tabs 18 between the first end 18a and the free end 18b is preferably tapered, and includes a camming surface 18c that facilitates flexion of the tab 18 during installation of the cable clamp 10 into an electrical box. It should be noted that one skilled in the art would readily appreciate that the outside snap-in tabs 18 can be located anywhere on the cable clamp. Further, the outside snap-in tab 18 can be a single member that extends around the perimeter of the base 12.

The guides 14 have a first end 14a secured to or integrally formed into the base 12, and a second end 14b as a free end. At least the free end 14b of each guide 14 includes a pressure tab 14c positioned in the gripping area 13 so as to help guide an electrical cable passing through the hollow center opening 12a of the base 12. One skilled in the art would readily appreciate that the pressure tabs 14c can extend along the length of the guide 14.

The fingers 16 have a first end 16a secured to or integrally formed into the base 12, and a second end 16b as a free end. The free end 16b of each finger 16 is positioned to extend into the gripping area 13. The area in the hollow center opening 12a of the base 12 where the free ends 14b of the guides 14 and the free ends 16b of the fingers 16 converge forms the gripping area 13 where the free ends 16b of fingers 16 are capable of gripping an electrical cable that is passed through the hollow center opening 12a of the base 12 and between the free ends 16b of the fingers 16. The free ends 16b of the fingers are positioned and shaped, e.g., tapered, so as to be able to flex imparting little resistance to the forward advancement of an electrical cable within the cable clamp 10, and to engage the electrical cable imparting sufficient resistance to rearward movement of the electrical cable to prevent easy withdrawal of the electrical cable from the cable clamp 10. In this exemplary embodiment, the first end 16a of each finger includes one or more inside snap-in tabs 20 used to releasable secure the cable clamp 10 to an electrical box. The inside snap-in tabs 20 have a camming surface (e.g., a rounded surface) 20a to facilitate the flexing of the fingers 16 and inside snap-in tabs 20 toward the hollow center opening 12a when inserting the cable clamp 10 into an electrical box, as will be described in more detail below.

In one embodiment, the base 12, guides 14 and fingers 16 can be formed as a single structure made of a polymeric or plastic material, such as injection molded thermoplastic. In another embodiment, the base 12, guides 14 and fingers 16 can be formed as separate structures made of a polymeric or plastic material, such as injection molded thermoplastic, and the guide and fingers are secured to the base by welding, e.g., sonic welding. Further, one skilled in the art would readily recognize that the guides 14 can be replaced with fingers 16 such that an electrical cable within the cable clamp 10 is engaged by each finger.

Figure 7:
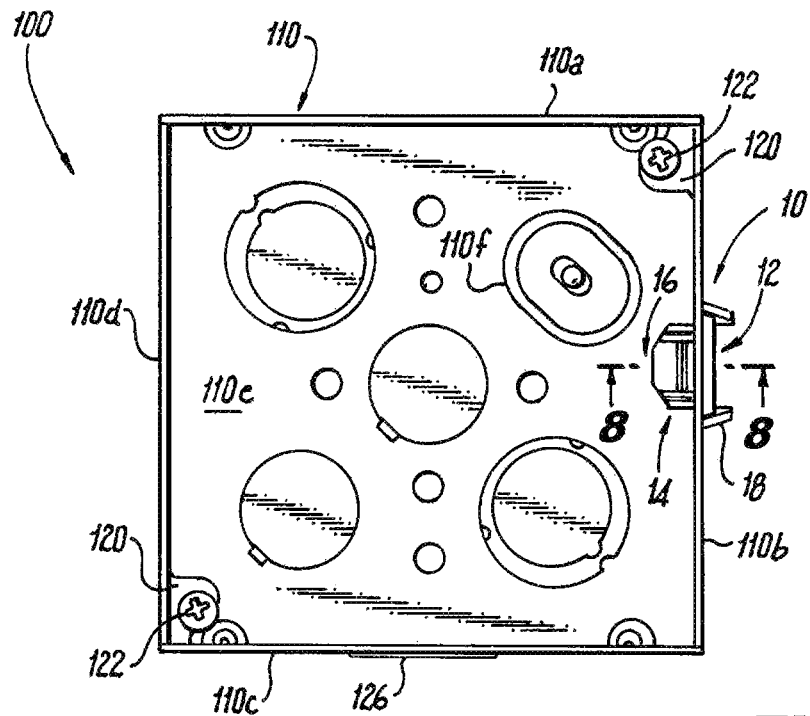
FIG. 7 is a top plan view of an electrical box assembly according to the present disclosure illustrating the cable clamp of FIG. 1 installed in a knock-out of an electrical box.
Figure 8:
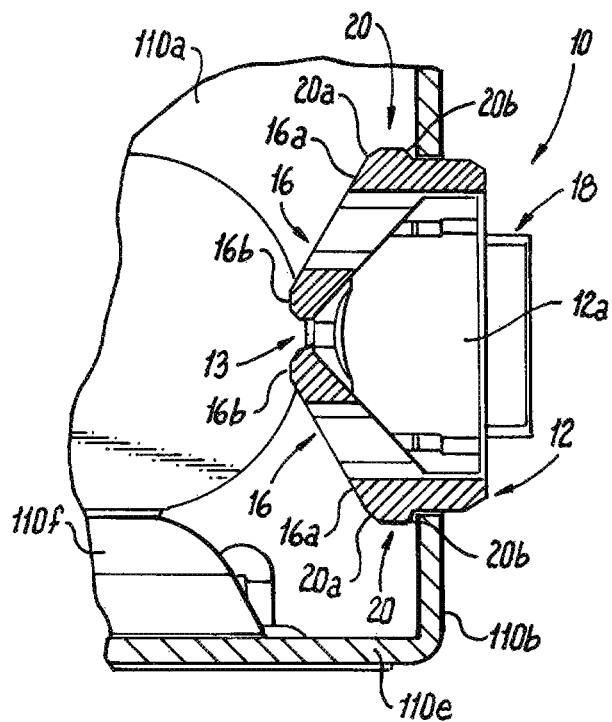
FIG. 8 is an enlarged partial cross-sectional view of the electrical box assembly of FIG. 7, taken along line 8-8.
Figure 9:
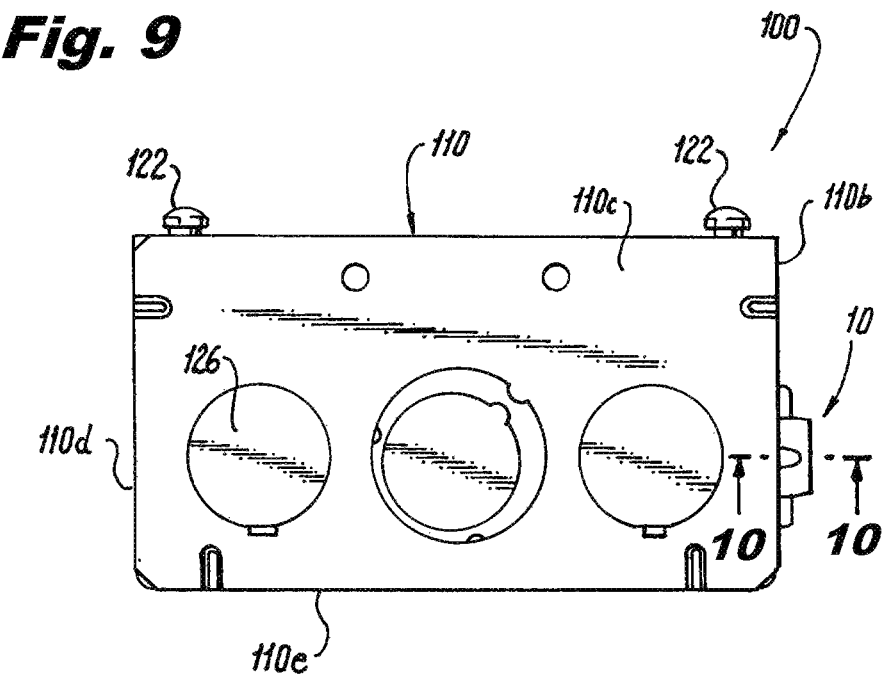
FIG. 9 is a side view of the electrical box assembly of FIG. 7.
Figure 10:
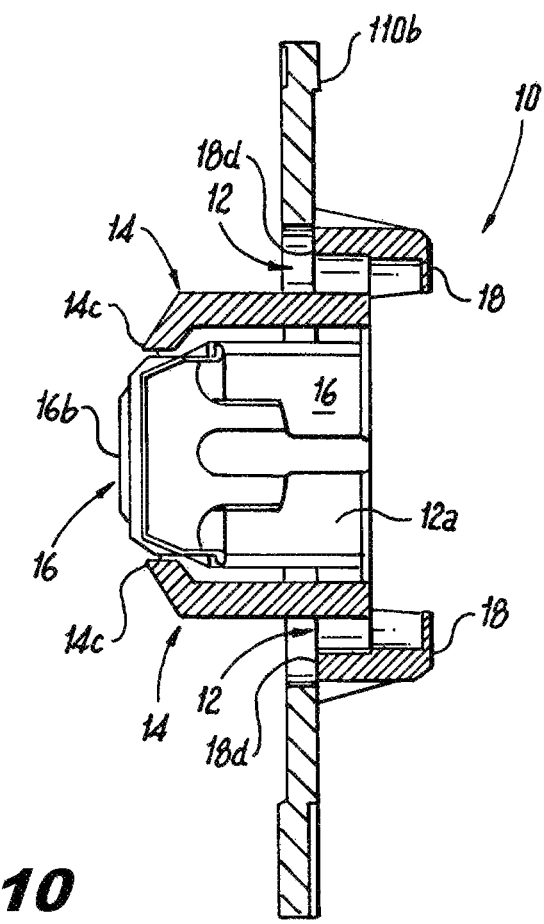
FIG. 10 is an enlarged partial cross-sectional view of the electrical box assembly of FIG. 9, taken along line 10-10.
Figure 11:
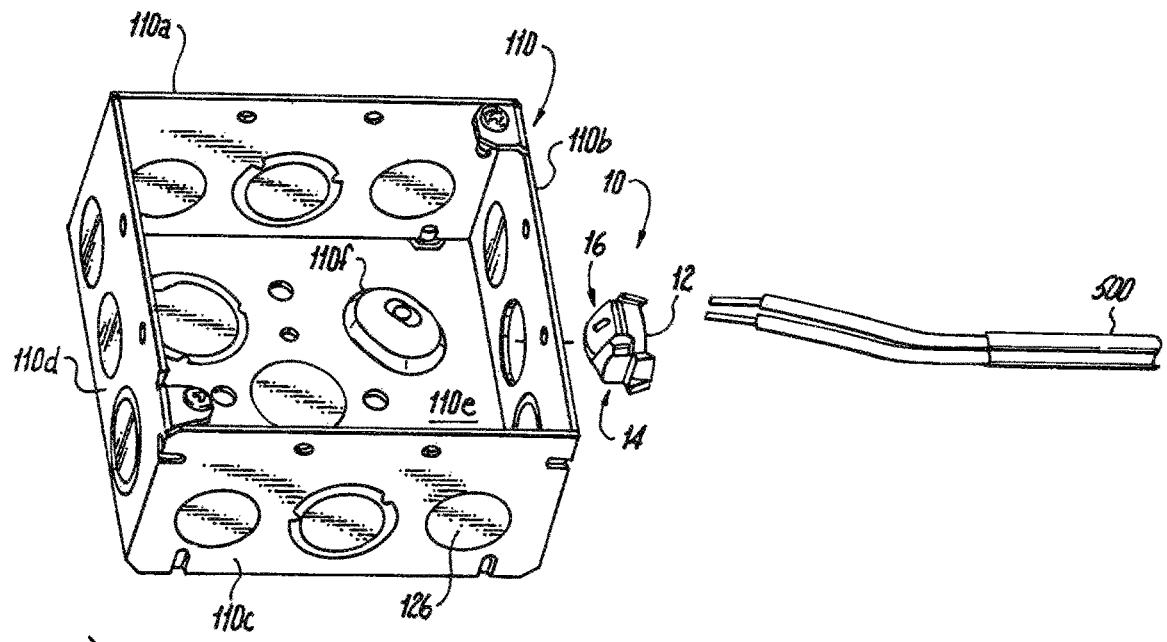
FIG. 11 is a perspective view of an electrical box with the cable clamp of FIG. 1 positioned for installation into a knock-out in the electrical box from outside the box and an electrical cable positioned for installation into the cable clamp.

Referring to FIG. 7, an exemplary embodiment of an electrical box assembly according to the present disclosure is shown. In this exemplary embodiment, the electrical box assembly 100 includes an electrical box 110 and one or more cable clamps 10. The electrical box 110 has four sides 110a-110d and a bottom 110e. The electrical box 110 can be fabricated from metal, e.g., steel or galvanized steel, or from non-metallic materials, such as plastic. An example of a suitable plastic material is injection molded thermoplastic. In the embodiment shown, the electrical box 110 is a conventional 4×4 square box (or what is also known in the industry as a 4" square box or a 1900 box), however any suitable sized electrical box may be used for the present disclosure. For example, single gang and additional multi-gang boxes, such as a 3 gang box or raceways, may be used for the electrical box of the present disclosure. Further, the depth of the electrical box 110 may vary. For example, the electrical box may be 1¼ inches, 1½ inches, 2⅛ inches, or 3½ inches in depth. The electrical box 110 may also include one or more mounting tabs 120 with threaded or tapped mounting holes, where threaded screws 122 (e.g., $\frac{8}{32}$ machine screws) can be inserted to secure a cover, e.g., a blank cover, a switch cover or a receptacle cover, or to secure an extension ring or plaster ring to the electrical box 110. The electrical box 110 may also include one or more knock-outs 126 that when removed create an opening in the electrical box 110 used to secure one or more cable clamps 10 to the electrical box. The knock-outs 126 can come in many sizes. For example, the knock-outs can be ½ inch, ¾ inch, 1 inch or greater in diameter. The electrical box 110 may also include one or more cable entrance pry-outs that when removed create an opening in the electrical box 110 to permit electrical cables to be inserted into the electrical box 110. To connect the electrical box 110 to electrical ground, a ground screw aperture may be included in the electrical box 110. In conventional 4×4 electrical boxes, the ground screw aperture is typically on a raised surface 110f of the bottom 110e of the electrical box 110, as seen in FIG. 7. The ground screw aperture is typically a threaded or tapped hole for insertion of a ground screw, e.g., an $\frac{8}{32}$ machine screw, that is typically color coded as green.

Figure 12:
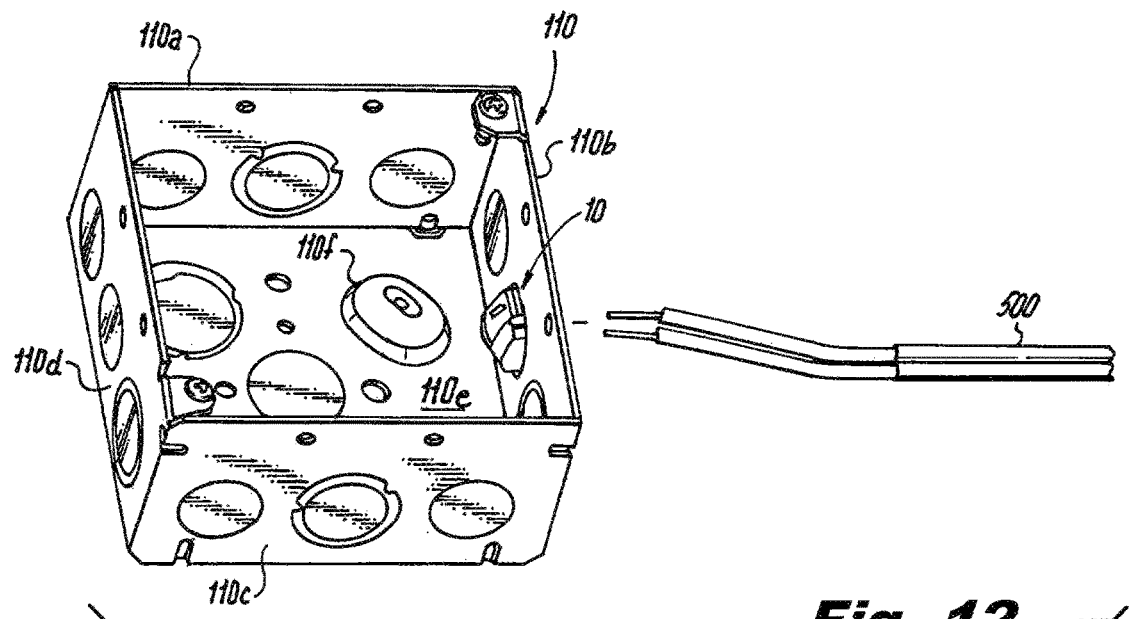
FIG. 12 is a perspective view of an electrical box with the cable clamp of FIG. 1 installed into a knock-out in the electrical box and an electrical cable positioned for installation into the cable clamp.

Referring to FIGS. 7-12, installing a cable clamp 10 of the present disclosure into the electrical box 110 from outside the electrical box will be described. To mount the cable clamp 10 to the electrical box 110, a knockout 126 is removed from the electrical box 110 to provide an opening 128 (seen in FIG. 11) in side 110b. The guides 14 and fingers 16 of the cable clamp 10 are then inserted into the opening 128 (FIG. 12). As the camming surface 20a of the inside snap-in tabs 20 engage the side wall 110b, the fingers 16 and inside snap-in tabs 20 flex inwardly toward the hollow center opening 12a of the base 12 until the inside snap-in tabs 20 pass through the opening 128. When the inside snap-in tabs 20 pass through the opening 128, force is removed from the fingers 16 and inside snap-in tabs 20 so that the inside tabs return to their normal, unflexed position. At this point, the inside snap-in tabs 20 are on the inside of the electrical box 110 with an outside facing wall 20b (seen in FIG. 8) resting against an inside surface of side 110b. In addition, an inside facing wall 18d (seen in FIG. 10) of the outside snap-in tabs 18 engage an outside surface of the side 110b to prevent the entire cable clamp 10 from passing through the opening 128 and into the electrical box 110. With this snap-in fit, the inside snap-in tabs and the outside snap-in tabs movably secure the cable clamp 10 to the electrical box 110 such that the cable clamp 10 can be rotated within the opening 128 while maintaining the cable clamp 10 within the opening 128.

Figure 13:
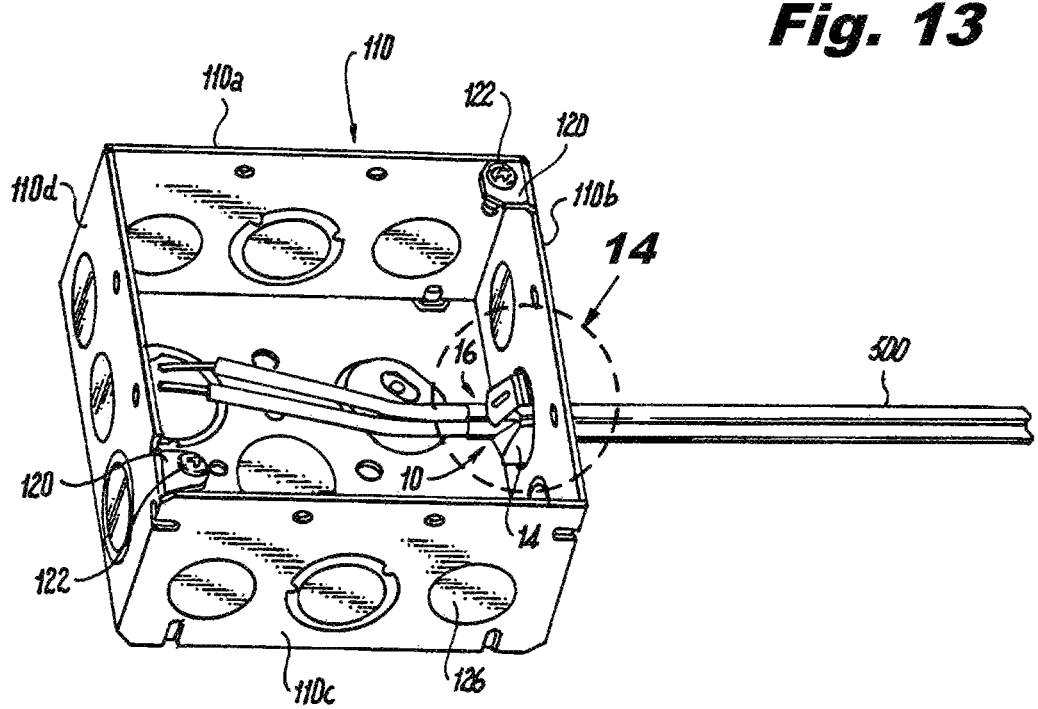
FIG. 13 is a perspective view of an electrical box with the cable clamp of FIG. 1 installed into a knock-out in the electrical box and an electrical cable installed in the cable clamp.
Figure 14:
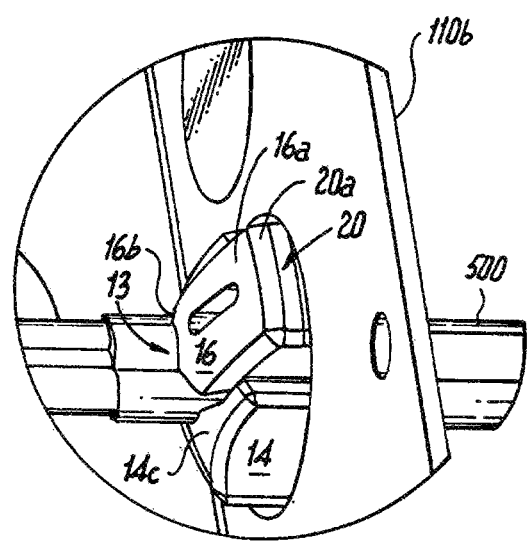
FIG. 14 is an enlarged view of a portion of the electrical box assembly of FIG. 13 illustrating an electrical cable installed in the cable clamp.

As shown in FIGS. 12-14, an electrical cable 500 can then be inserted into the cable clamp 10. More specifically, the electrical cable 500 is inserted into the hollow center opening 12a of the cable clamp toward the gripping area 13. When the electrical cable 500 engages the free end 16b of the fingers 16 additional force can be applied to the electrical cable to cause the fingers 16 to flex so that the free ends 16b separate sufficiently to allow the electrical cable to pass through the cable clamp 10 and into the electrical box 110. As noted, the free ends 16b are shaped to flex imparting little resistance to the forward advancement of the cable within the cable clamp 10, while imparting sufficient resistance to rearward movement of the cable to prevent withdrawal of the cable from the cable clamp 10. The pressure tabs 14c of the cable guides 14 apply pressure to the sides of the electrical cable 500 to ensure the electrical cable stays within the gripping area 13 of the cable clamp 10, as seen in FIG. 14.

Figure 15:
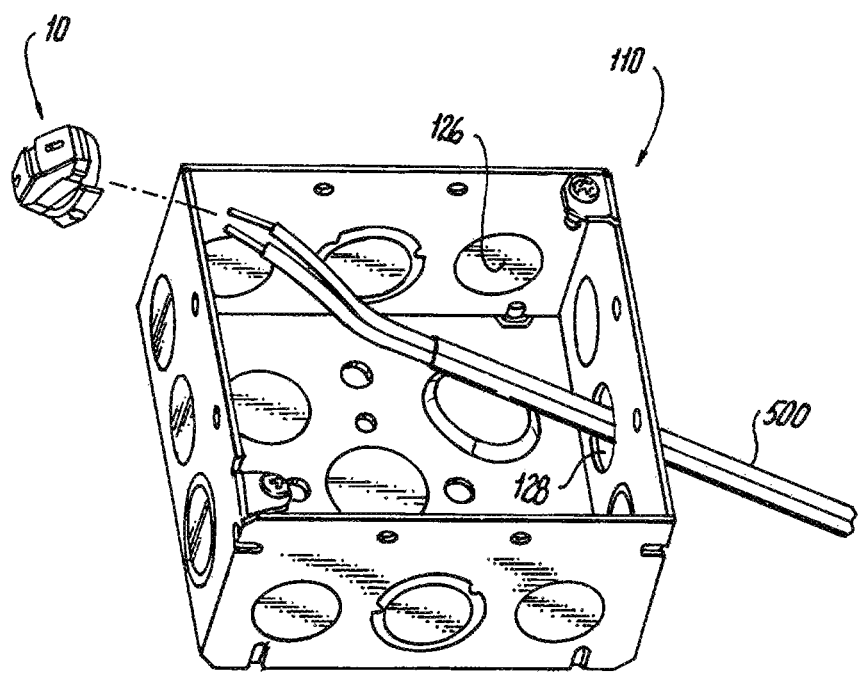
FIG. 15 is a perspective view of an electrical box and the first step for installing the cable clamp of FIG. 1 and the electrical cable into a knock-out in the electrical box from inside the box.
Figure 16:
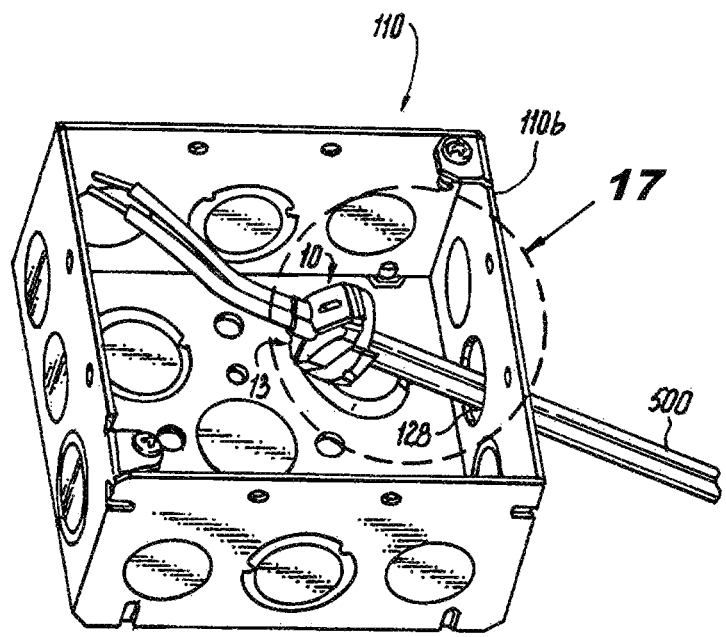
FIG. 16 is a perspective view of an electrical box and the second step for installing the cable clamp of FIG. 1 and the electrical cable into a knock-out in the electrical box from inside the box.
Figure 17:
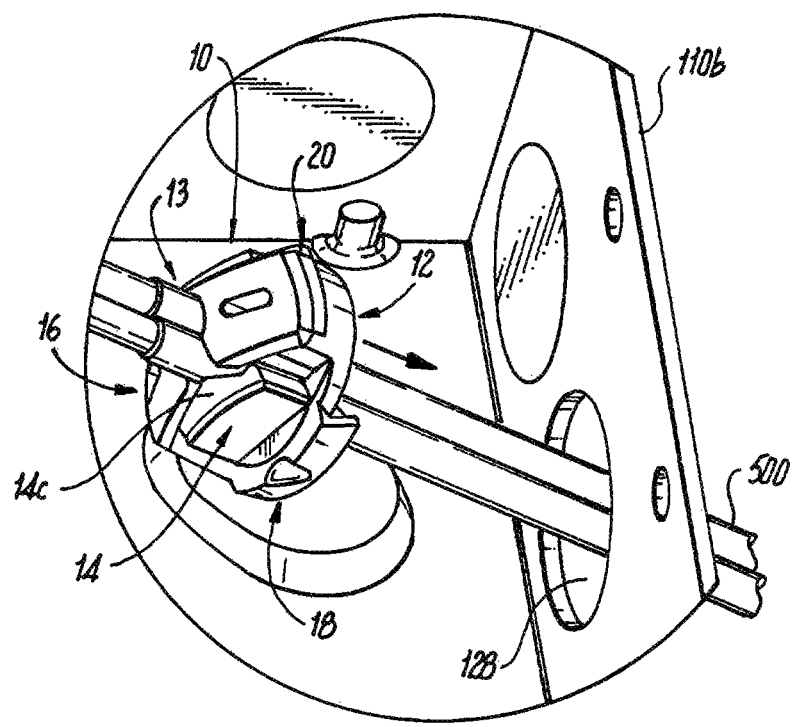
FIG. 17 is an enlarged view of a portion of the electrical box, the cable clamp and the electrical cable of FIG. 16 being installed in a knock-out of the electrical box.
Figure 18:
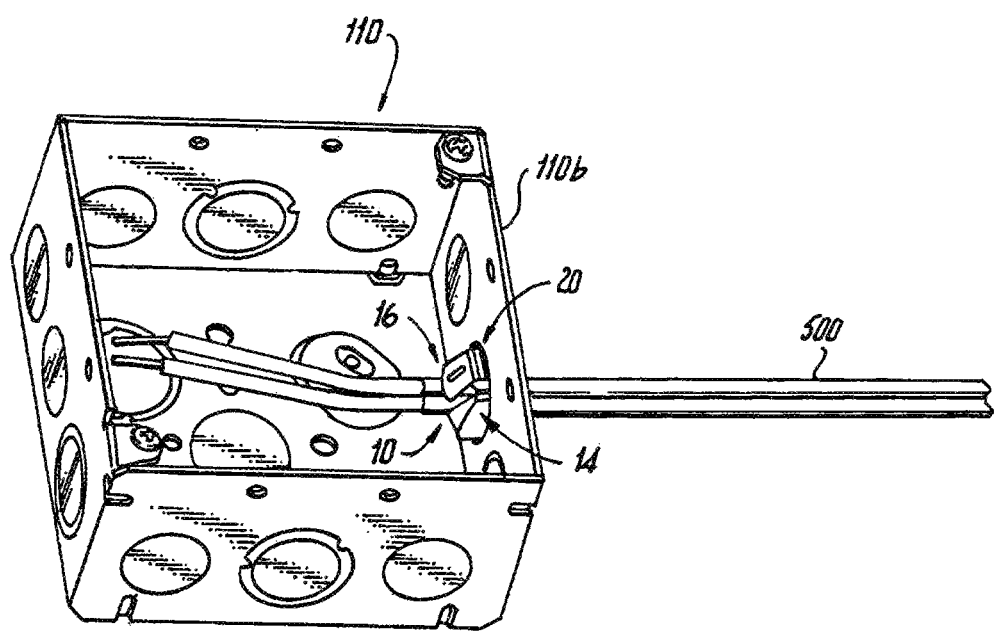
FIG. 18 is a perspective view of the electrical box and the third step for installing the cable clamp of FIG. 1 and the electrical cable into a knock-out in the electrical box from inside the box.
Figure 19:
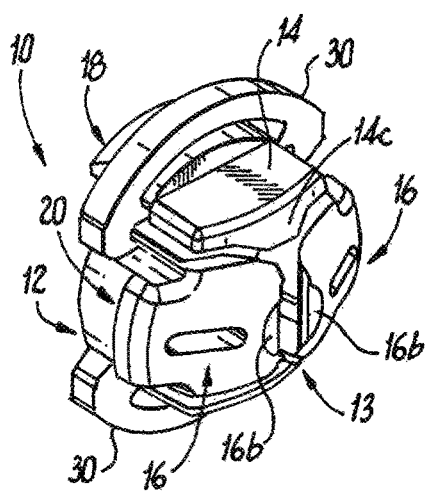
FIG. 19 is a front side perspective view of another exemplary embodiment of a cable clamp according to the present disclosure.
Figure 20:
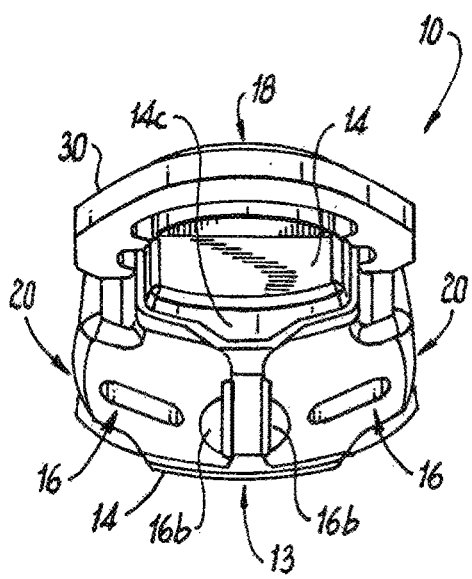
FIG. 20 is a front side perspective view of the cable clamp of FIG. 19 taken from an opposite side of the cable clamp of FIG. 19.
Figure 21:
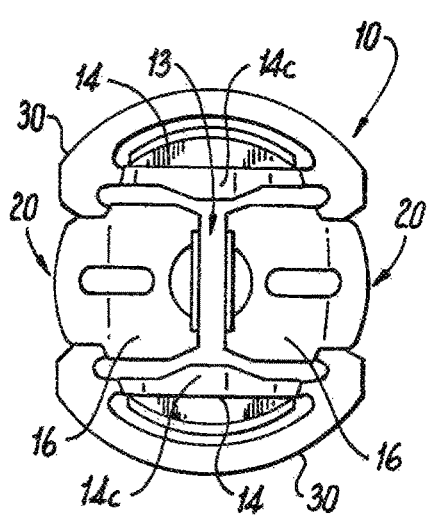
FIG. 21 is front plan view of the cable clamp of FIG. 19.
Figure 22:
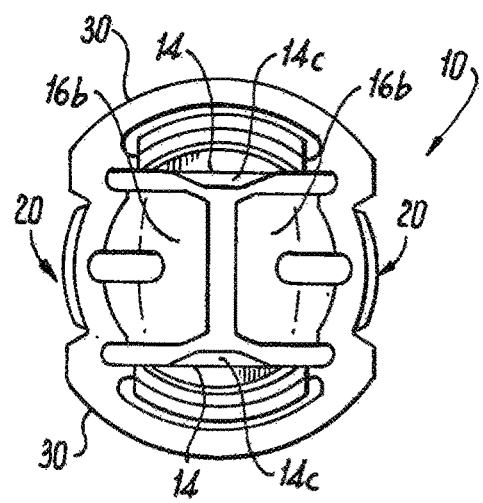
FIG. 22 is rear plan view of the cable clamp of FIG. 19.

Referring to FIGS. 7-10 and 15-18, installing a cable clamp 10 of the present disclosure into the electrical box 110 from inside the electrical box will be described. To mount the cable clamp 10 to the electrical box 110, a knockout 126 is removed from the electrical box 110 to provide an opening 128 in side 110b, as seen in FIG. 15. An electrical cable 500 is then passed through the opening 128, and into the hollow center opening 12a of the cable clamp 10. When the electrical cable 500 reaches the gripping area 13 and engages the free ends 16b of the fingers 16 additional force can be applied to the electrical cable to cause the fingers 16 to flex so that the free ends 16b separate sufficiently to allow the electrical cable to pass through the cable clamp 10, as seen in FIG. 16. As noted, the free ends 16b of the fingers 16 are configured or shaped to flex imparting little resistance to the forward advancement of the cable within the cable clamp 10, while imparting sufficient resistance to rearward movement of the cable to prevent easy withdrawal of the cable from the cable clamp 10. The pressure tabs 14c of the guides 14 apply pressure to the sides of the electrical cable 500 to ensure the electrical cable stays within the gripping area 13 of the cable clamp 10, as seen in FIGS. 16 and 17. The outside snap-in tabs 18 of the cable clamp 10 are then inserted into the opening 128 (seen in FIG. 17). As the camming surface 18c of the outside snap-in tabs 18 engage the side wall 110b, the outside snap-in tabs 18 flex inwardly toward the hollow center 12a of the cable clamp 10 so that the outside snap-tabs 18 pass through the opening 128. As the first end 18a of the outside snap-in tab passes through opening 128, the force applied by the side 110b on the snap-in tabs 18 is removed from the outside snap-in tabs such that the outside snap-in tabs snap back to their normal, unflexed position. At this point, the outside snap-in tabs 18 are on the outside of the electrical box 110 with the inside facing wall 18d of the outside snap-in tabs 18 engaging an outside surface of the side 110b, and the outside facing wall 20b (seen in FIG. 8) of the inside snap-in tabs 20 is resting against the inside surface of side 110b. With this snap-in fit, the inside snap-in tabs and the outside snap-in tabs movably secure the cable clamp 10 to the electrical box 110 such that the cable clamp 10 can be rotated within the opening 128 while maintaining the cable clamp 10 within the opening 128.

Referring now to FIGS. 19-22, another exemplary embodiment of the cable clamp according to the present disclosure is shown. In this exemplary embodiment, the cable clamp 10 includes a base 12, a pair of guides 14, a pair of fingers 16 that are secured to the base and flexible relative to the base, and a pair of clamp holding members 30. The base 12, guides 14 and fingers 16 are similar to and operate the same as the guides and fingers described above, and a description of each is not repeated. In this exemplary embodiment, the clamp holding members 30 are secured to or integrally formed into the base 12 adjacent the outside snap-in tabs 18. The clamp holding members 30 can be formed of a polymeric or plastic material, such as injection molded thermoplastic. The clamp holding members 30 provide additional surface area to engage the outside surface of the electrical box 110 when the cable clamp 10 is installed into the electrical box. This additional surface area can compensate for variations in the diameter of the knock-outs during fabrication of the electrical boxes. Further, the additional surface area permits the use of one size cable clamp 10 in different size knock-outs. For example, the diameter of the base may be configured for a ½ inch knock-out, but with the clamp holding members 30, the cable clamp 10 can fit into ¾ inch or 1 inch size knock-outs. In this exemplary embodiment, the cable clamp is inserted into the electrical box 110 from the outside as described above.

Referring to FIGS. 23-29, an exemplary embodiment of a cable clamp assembly according to the present disclosure is shown. In this exemplary embodiment, the cable clamp assembly 50 has two cable clamps 52 that can either share a common frame 54 so that the cable clamps 52 are positioned side-by-side, or can be separate components that are secured together so that the cable clamps 52 are positioned side-by-side. The cable clamp assembly 50 is configured to fit within pry-outs of an electrical box, as will be described in more detail below.

Figure 23:
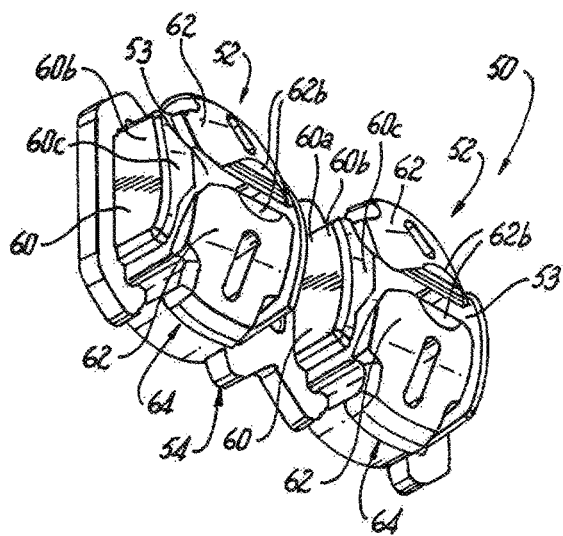
FIG. 23 is a front side perspective view of an exemplary embodiment of a cable clamp assembly according to the present disclosure.
Figure 24:
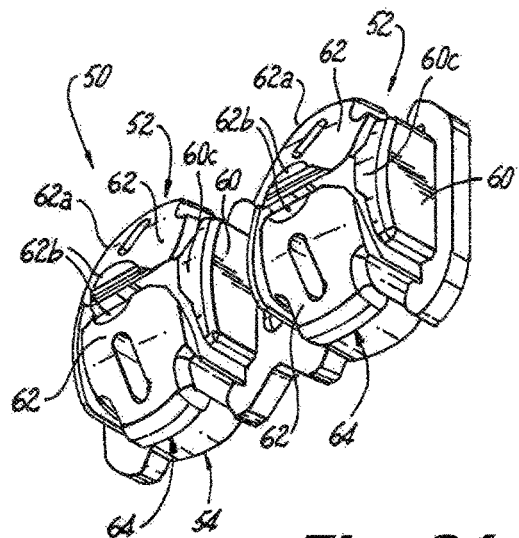
FIG. 24 is a front side perspective view of the cable clamp assembly of FIG. 23 taken from an opposite side of the cable clamp assembly of FIG. 23.
Figure 25:
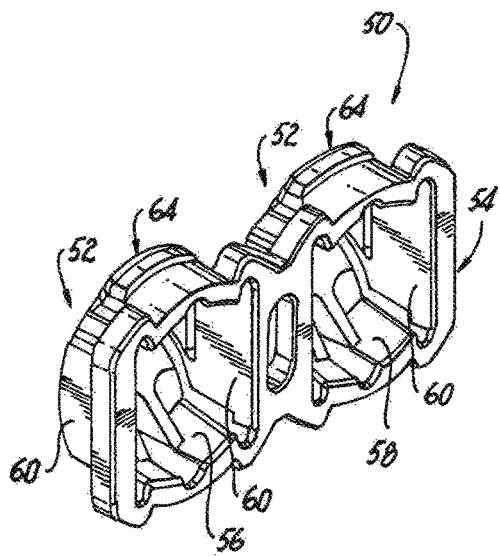
FIG. 25 is a rear side perspective view of the cable clamp assembly of FIG. 23.
Figure 26:
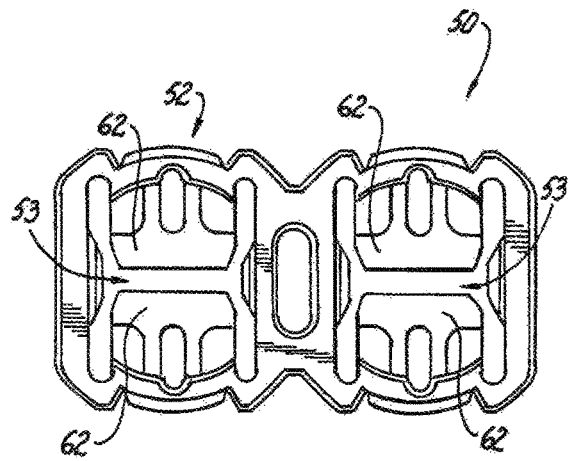
FIG. 26 is a rear plan view of the cable clamp assembly of FIG. 23.

The cable clamp assembly 50 shown in the figures and described herein comprises two cable clamps 52 that share a common frame 54 so that the cable clamps 52 are positioned side-by-side (seen in FIGS. 23 and 24). Each cable clamp 52 has a gripping area 53 (seen in FIGS. 24 and 29) where an electrical cable can be gripped by the cable clamp 52 in such a way as to impart little resistance to the forward advancement of an electrical cable within the cable clamp 52, and to engage the electrical cable imparting sufficient resistance to rearward movement of the cable to prevent easy withdrawal of the cable from the cable clamp 52. Referring to FIGS. 25 and 26, in this exemplary embodiment, the frame 54 includes a pair of hollow openings 56 and 58, each sufficient to allow an electrical cable to pass through the cable clamp 52, as will be described in more detail below.

Figure 27:
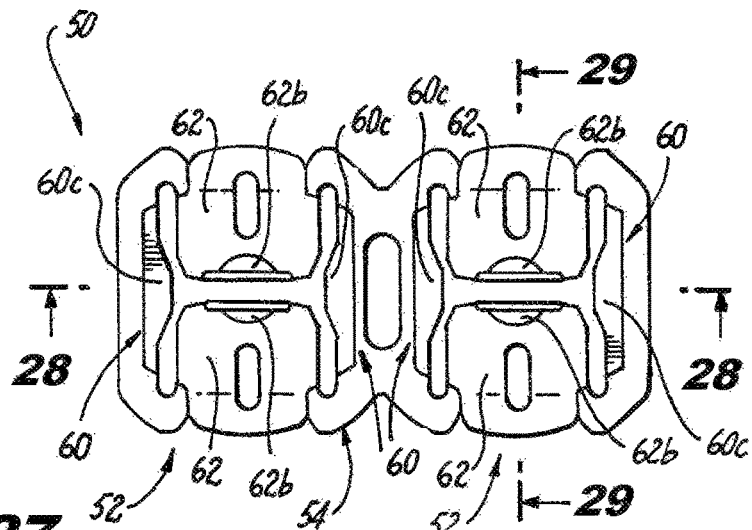
FIG. 27 is a front plan view of the cable clamp assembly of FIG. 23.
Figure 28:
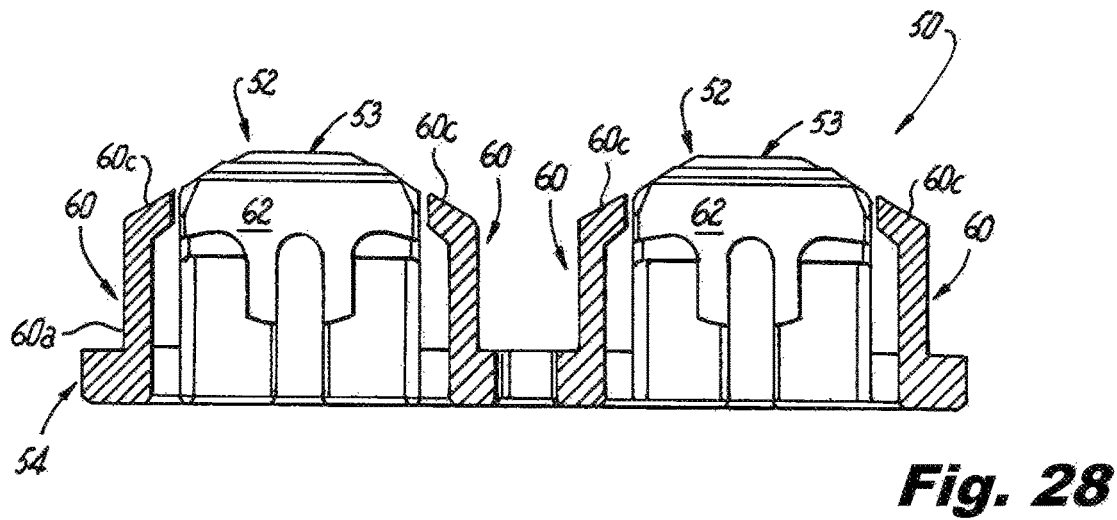
FIG. 28 is a cross-sectional view of the cable clamp assembly of FIG. 27 taken along line 28-28.
Figure 29:
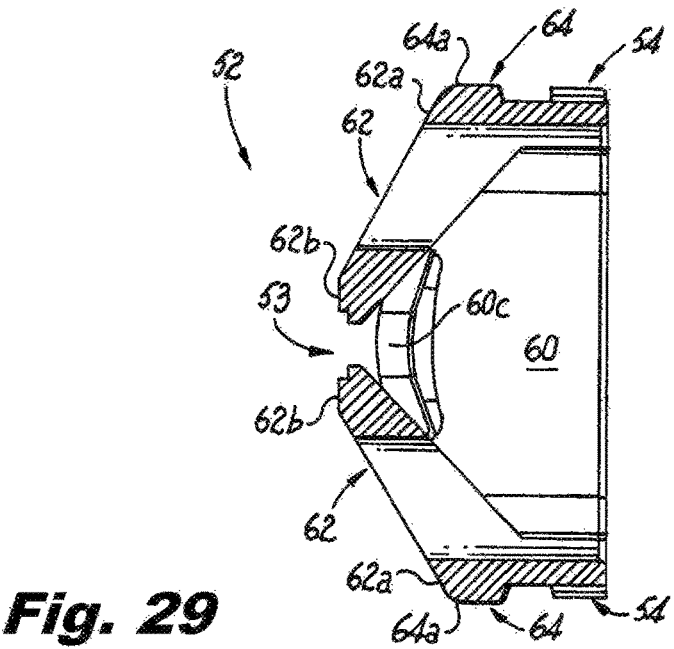
FIG. 29 is a cross-sectional view of the cable clamp assembly of FIG. 27 taken along line 29-29.

Referring to FIGS. 27-29, each cable clamp 52 includes a pair of cable guide members (also called "guides") 60, and a pair of clamp members (also called "fingers") 62 that are secured to the frame and are flexible relative to the frame. The guides 60 have a first end 60a (seen in FIG. 28) secured to or integrally formed into the frame 54, and a second end 60b as a free end (seen in FIGS. 23 and 28). At least the free end 60b of each guide 60 includes a pressure tab 60c positioned in the gripping area 53 so as to help guide an electrical cable passing through the hollow center opening 56 or 58 of the frame 54 within the respective gripping area 53. One skilled in the art would readily appreciate that the pressure tabs 60c can extend along the length of the guide 60. The fingers 62 have a first end 62a secured to or integrally formed into the frame 54, and a second end 62b as a free end. The free end 62b of each finger 62 is positioned to extend into the gripping area 53 (seen in FIG. 29). The area in the hollow center opening of each cable clamp 52 where the free ends 60b of the guides 60, and the free ends 62b of the fingers 62 converge forms the respective gripping area 53, where the free ends 62b of the fingers 62 are capable of gripping an electrical cable that is passed through the hollow center opening 56 or 58 of the frame 54 and between the free ends 62b of the fingers 62. The free ends 62b of the fingers 62 are positioned and shaped, e.g., tapered, so as to flex imparting little resistance to the forward advancement of the cable within the cable clamp 52, and to engage the electrical cable imparting sufficient resistance to rearward movement of the cable to prevent easy withdrawal of the cable from the cable clamp 52.

In one embodiment, the frame 54, guides 60, and fingers 62 can be formed as a single structure made of a polymeric or plastic material, such as injection molded thermoplastic. In another embodiment, the frame 54, guides 60 and fingers 62 can be formed as separate structures made of a polymeric or plastic material, such as injection molded thermoplastic, and the guide and fingers are secured to the frame by welding, e.g., sonic welding. Further, one skilled in the art would readily recognize that the guides 60 can be replaced with fingers 62 such that an electrical cable within the cable clamps 52 is engaged by each finger.

As noted above, the cable clamp assembly 50 is configured and dimensioned to fit within pry-outs of an electrical box, and to be releasably secured to the electrical box. In this exemplary embodiment, to releasably secure the cable clamp assembly 50 to the electrical box, the frame 54 has outside dimensions that enable at least a portion of the frame 54 to engage an outer surface of an electrical box, and the fingers 62 have one or more snap-in tabs 64 (seen in FIG. 29). In this exemplary embodiment, the one or more snap-in tabs 64 comprises two snap-in tabs, one for each finger 62. The snap-in tabs 64 have a camming surface (e.g., a rounded surface) 64a to facilitate the flexing of the fingers 62 and snap-in tabs 64 toward the hollow center opening 56 or 58 when inserting the cable clamp assembly 50 into an electrical box, as will be described in more detail below. It should be noted that one skilled in the art would readily appreciate that the snap-in tabs 64 may be positioned on the frame 54 or the guides 60 instead of the fingers 62.

Figure 30:
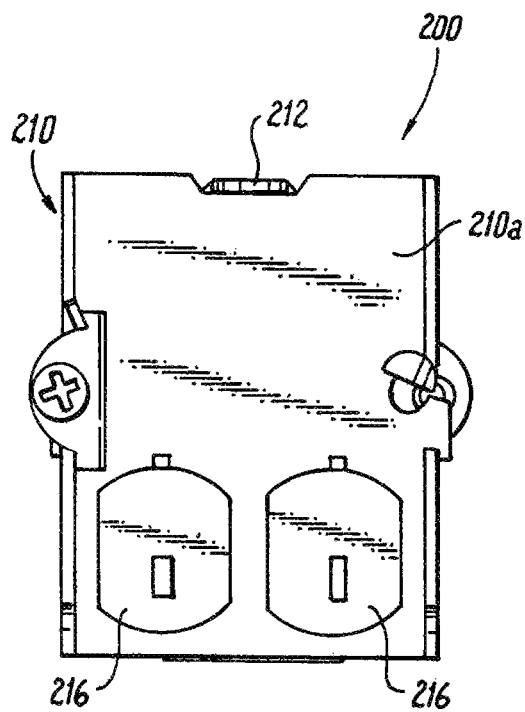
FIG. 30 is a side elevation view of a single gang electrical switch box having pry-outs for installing the cable clamp assembly of FIG. 23.
Figure 31:
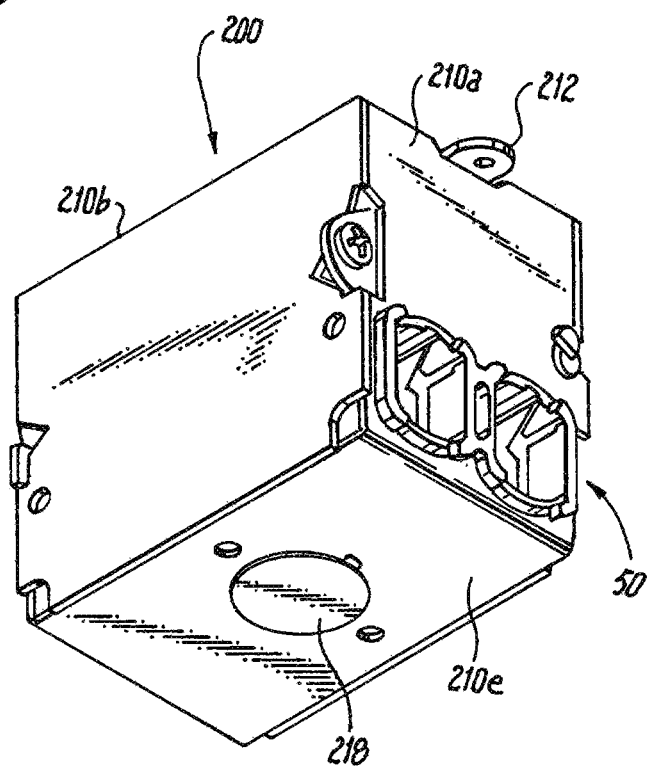
FIG. 31 is a bottom perspective view of the single gang electrical switch box of FIG. 30 with a cable clamp assembly installed in pry-outs of the electrical switch box to form an electrical box assembly.
Figure 32:
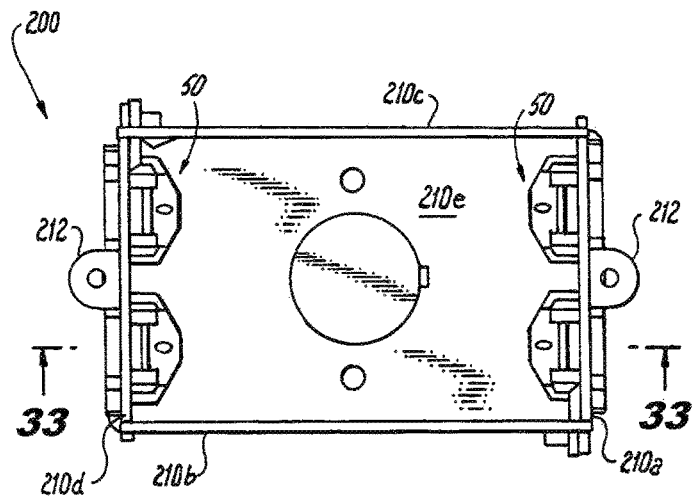
FIG. 32 is a top plan view of the electrical box assembly of FIG. 31, with two cable clamps assemblies installed in pry-outs of the electrical box.
Figure 33:
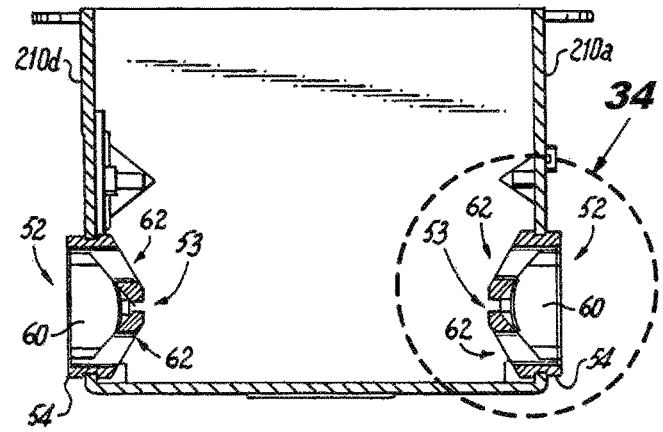
FIG. 33 is a cross-sectional view of the electrical box assembly of FIG. 32 taken along line 33-33.
Figure 34:
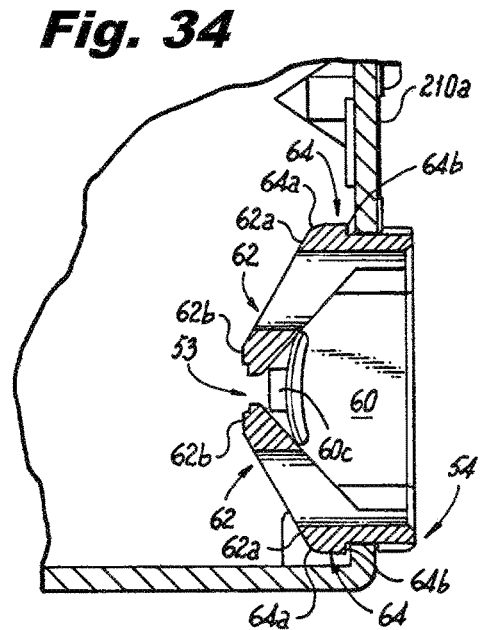
FIG. 34 is an enlarged portion of the electrical box assembly of FIG. 33.
Figure 35:
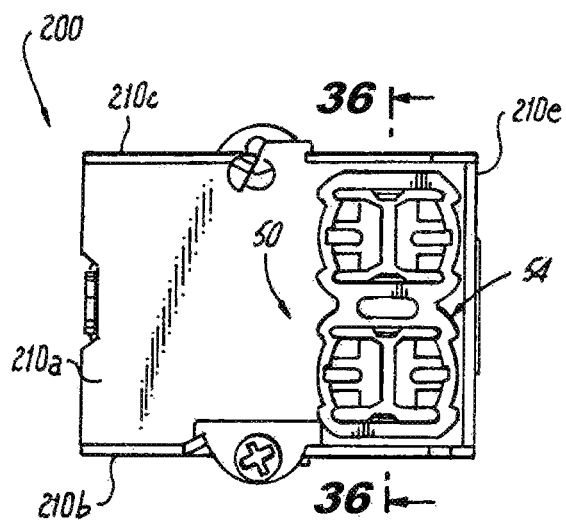
FIG. 35 is an elevation view of one end of the electrical box assembly of FIG. 31.
Figure 36:
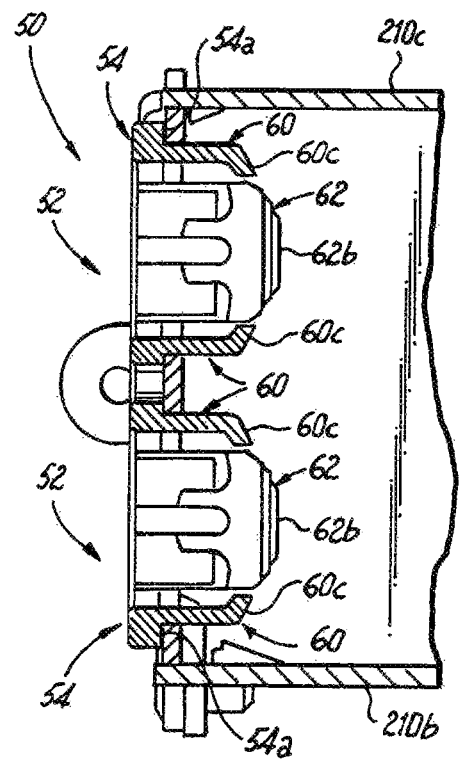
FIG. 36 is a cross-sectional view of the electrical box assembly of FIG. 35 taken along line 36-36.
Figure 37:
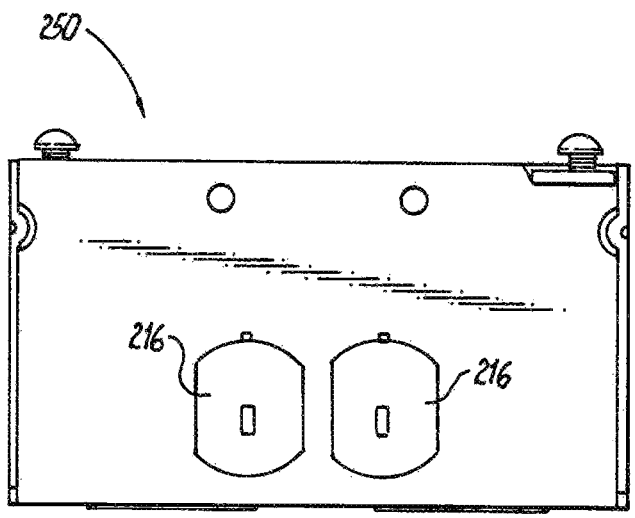
FIG. 37 is a side elevation view of an electrical box having pry-outs for a cable clamp assembly of FIG. 23.
Figure 38:
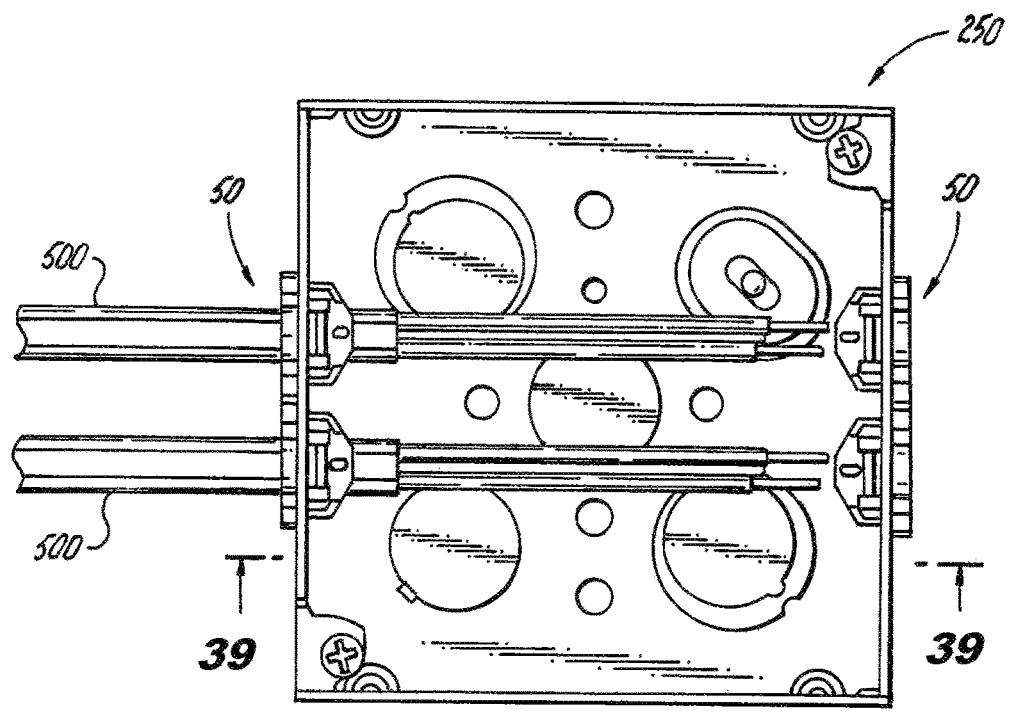
FIG. 38 is a top plan view of the electrical box of FIG. 37 having cable clamp assemblies of FIG. 23 installed in the pry-outs to form an electrical box assembly, and electrical cabling installed in one cable clamp assembly.
Figure 39:
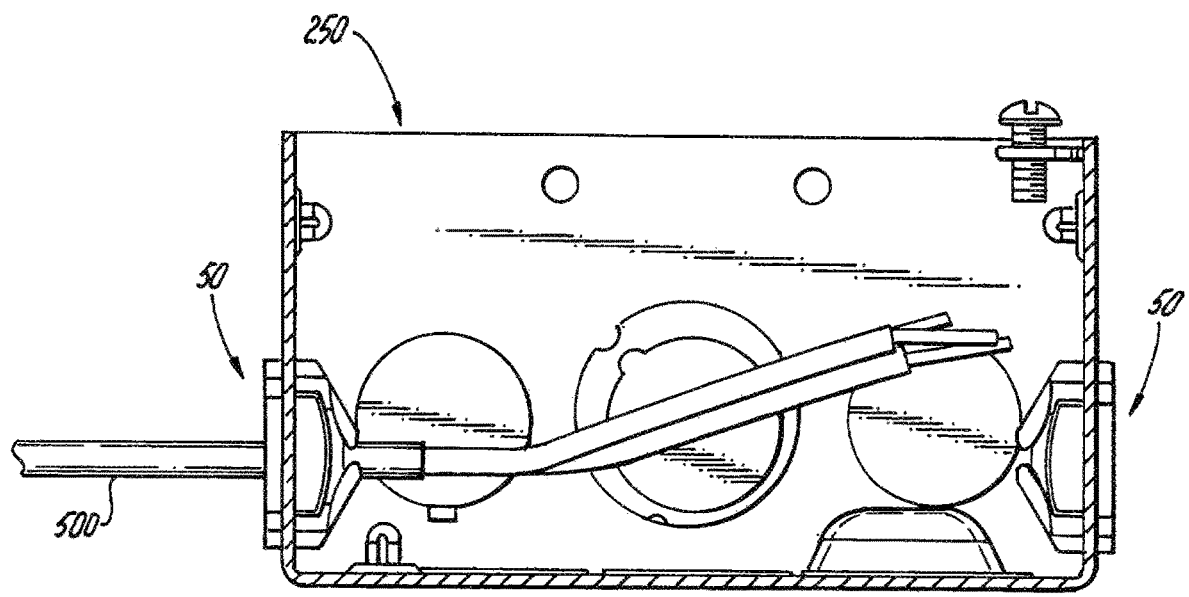
FIG. 39 is a cross-sectional view of the electrical box assembly of FIG. 38 taken along line 39-39.
Figure 40:
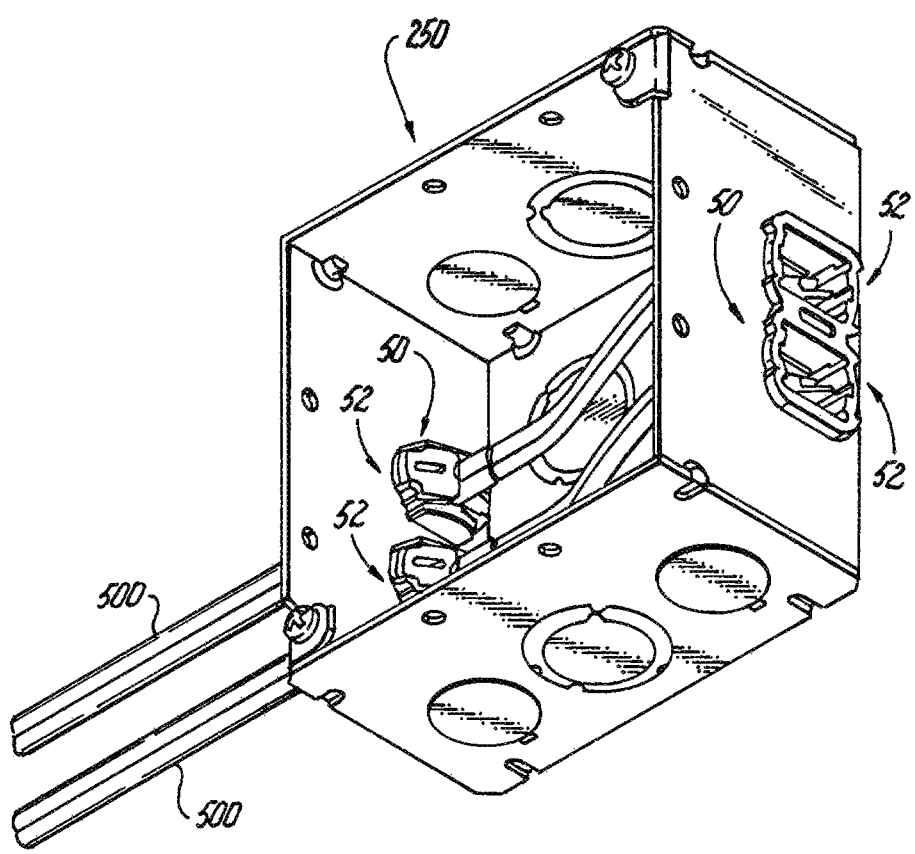
FIG. 40 is a top perspective view of the electrical box assembly of FIG. 38.
Figure 41:
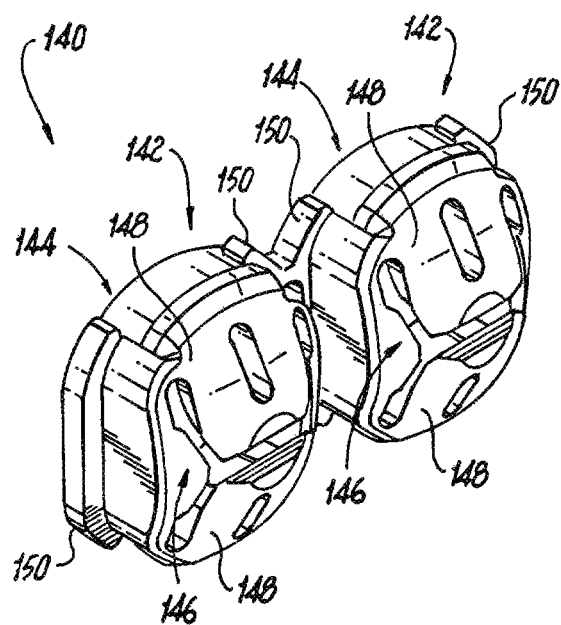
FIG. 41 is a front side perspective view of another exemplary embodiment of a cable clamp assembly according to the present disclosure.
Figure 42:
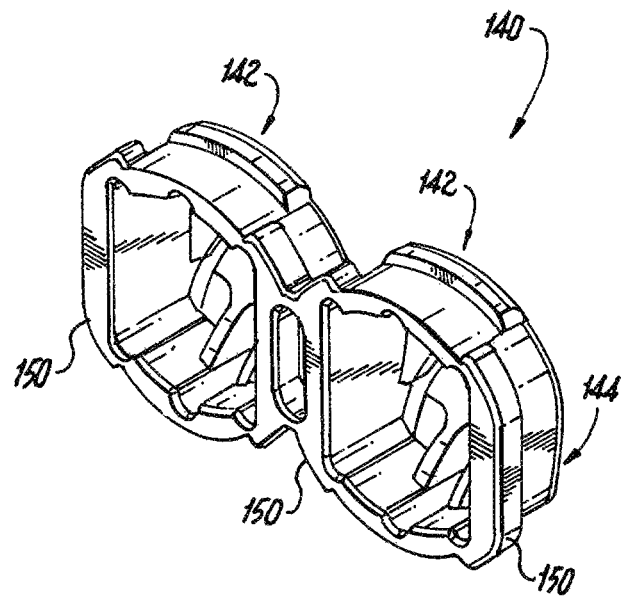
FIG. 42 is a rear perspective view of the cable clamp assembly of FIG. 41.
Figure 43:
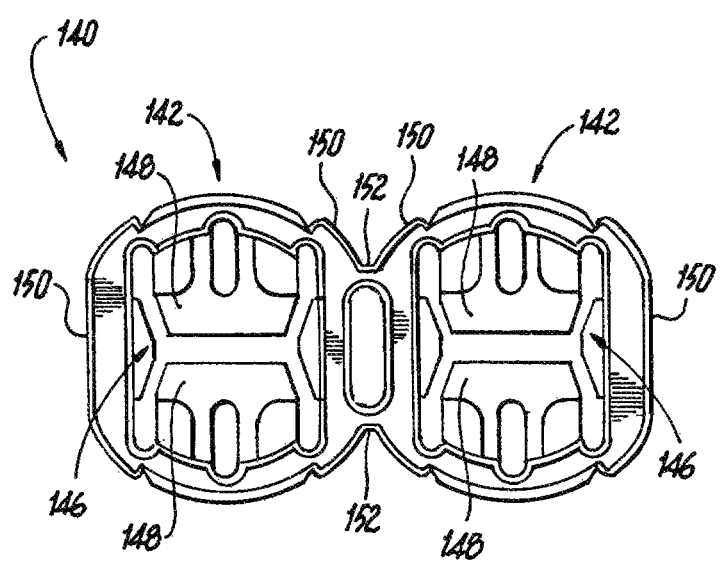
FIG. 43 is rear plan view of the cable clamp assembly of FIG. 41.
Figure 44:
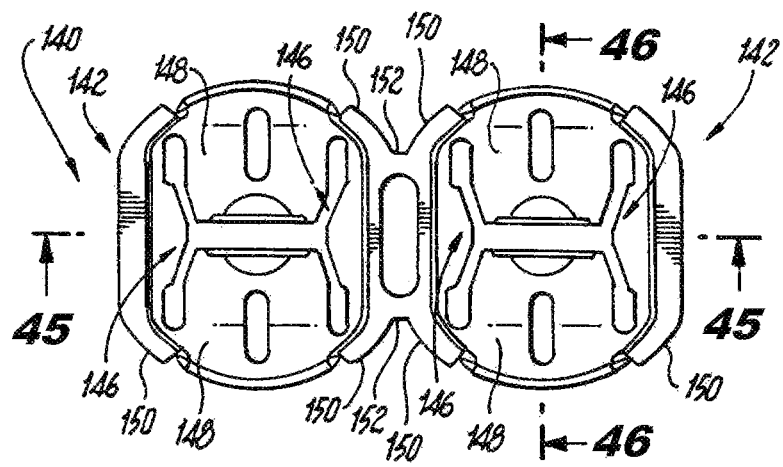
FIG. 44 is front plan view of the cable clamp assembly of FIG. 41.
Figure 45:
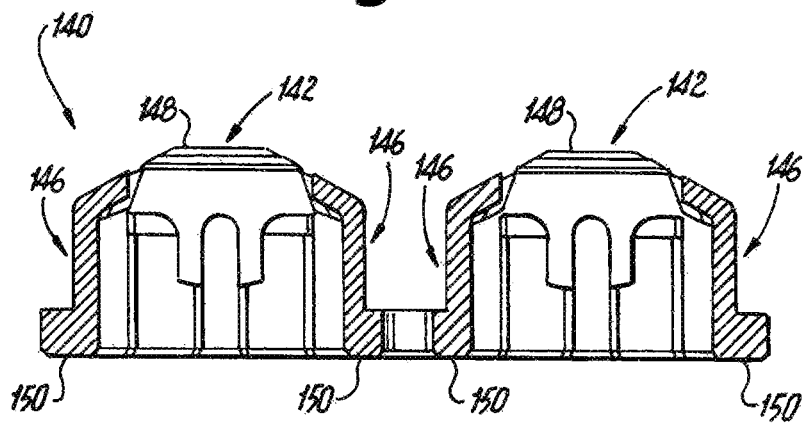
FIG. 45 is a cross-sectional view of the cable clamp assembly of FIG. 44 taken along line 45-45.
Figure 46:
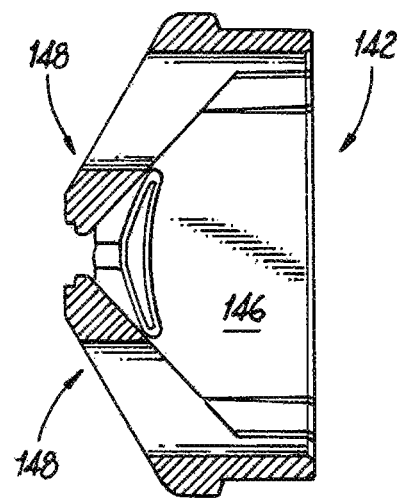
FIG. 46 is a cross-sectional view of the cable clamp assembly of FIG. 44 taken along line 46-46.
Figure 47:
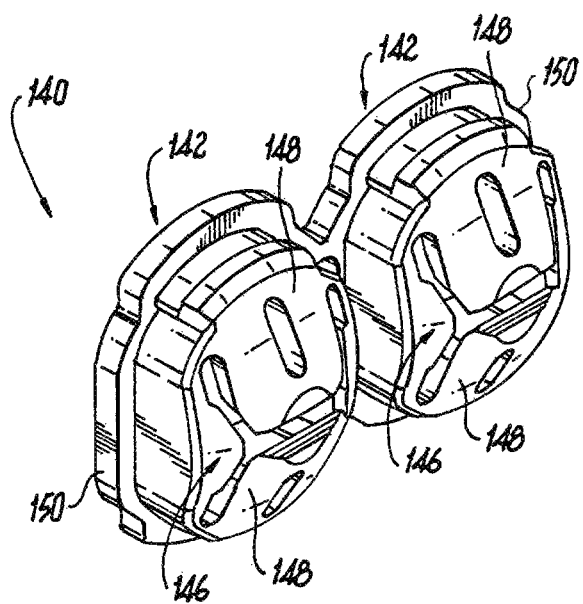
FIG. 47 is a front side perspective view of another exemplary embodiment of a cable clamp assembly according to the present disclosure.
Figure 48:
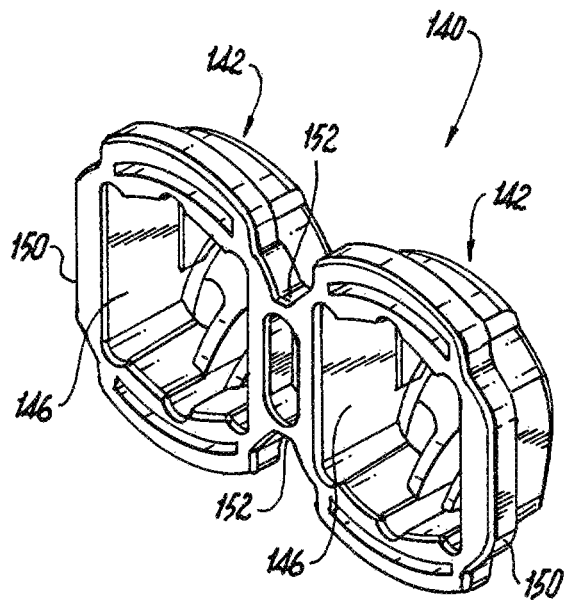
FIG. 48 is a rear perspective view of the cable clamp assembly of FIG. 47.
Figure 49:
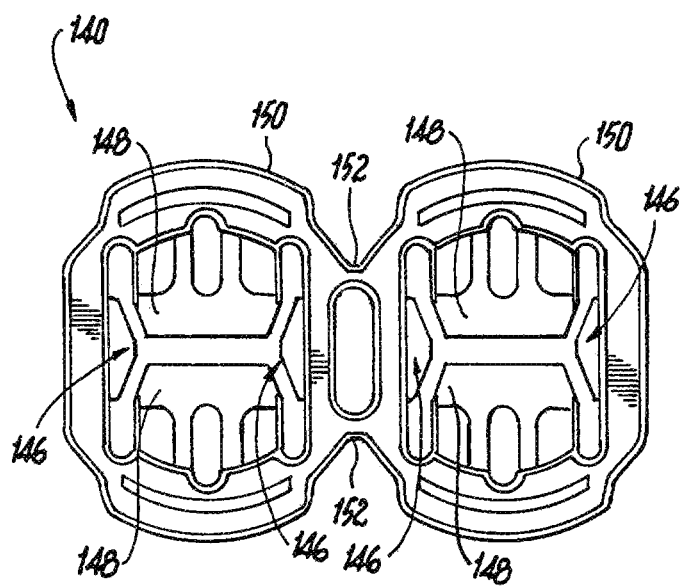
FIG. 49 is rear plan view of the cable clamp assembly of FIG. 47.
Figure 50:
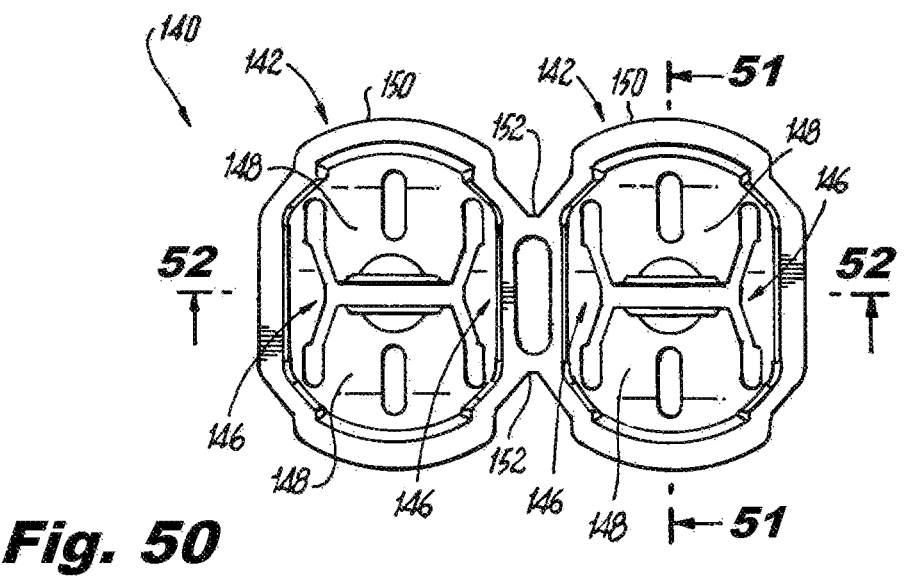
FIG. 50 is front plan view of the cable clamp assembly of FIG. 47.
Figure 51:
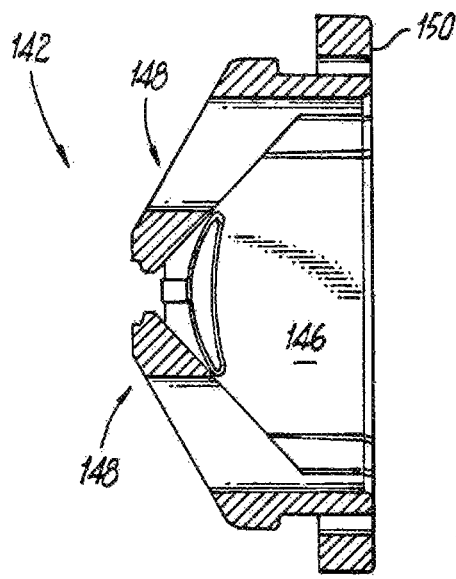
FIG. 51 is a cross-sectional view of the cable clamp assembly of FIG. 50 taken along line 51-51.
Figure 52:
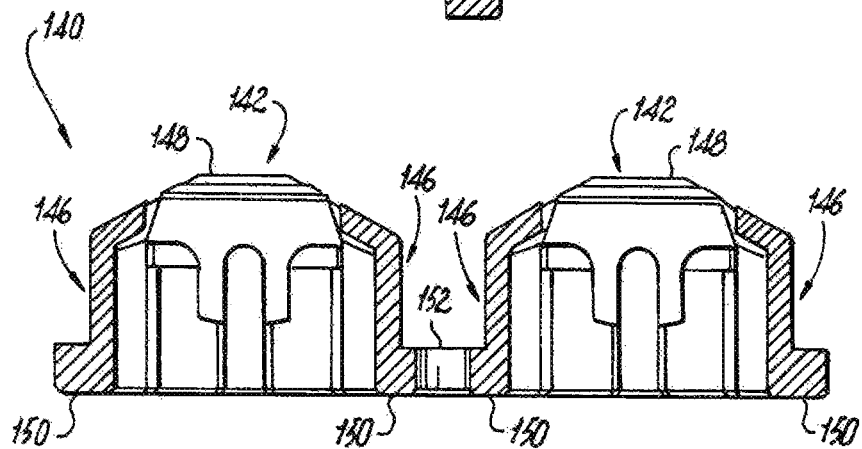
FIG. 52 is a cross-sectional view of the cable clamp assembly of FIG. 50 taken along line 52-52.
Figure 53:
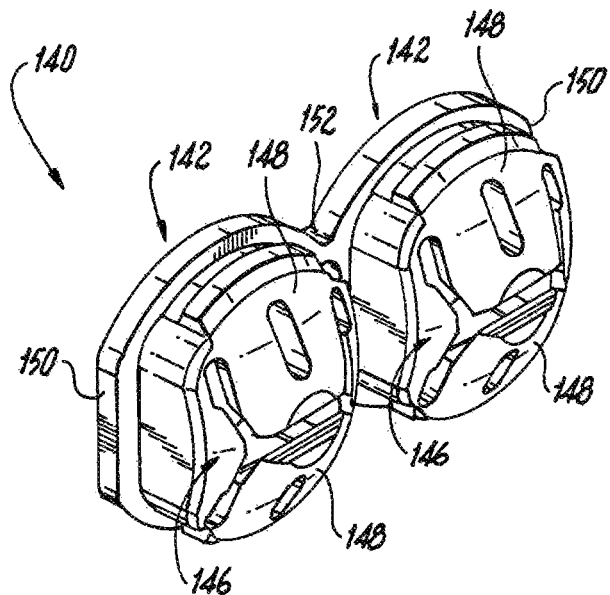
FIG. 53 is a front side perspective view of another exemplary embodiment of a cable clamp assembly according to the present disclosure.
Figure 54:
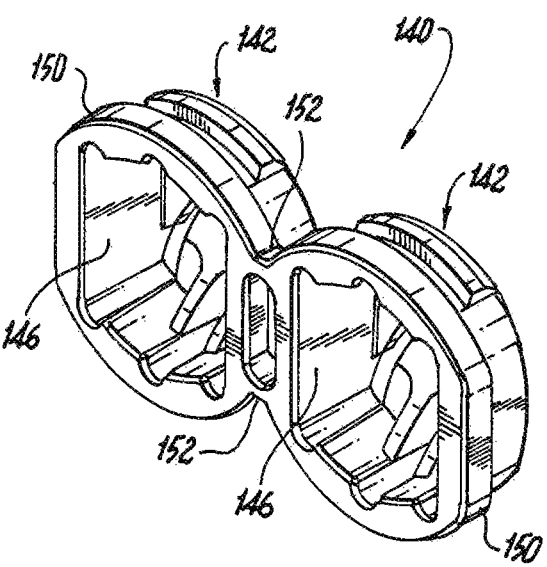
FIG. 54 is a rear perspective view of the cable clamp assembly of FIG. 53.
Figure 55:
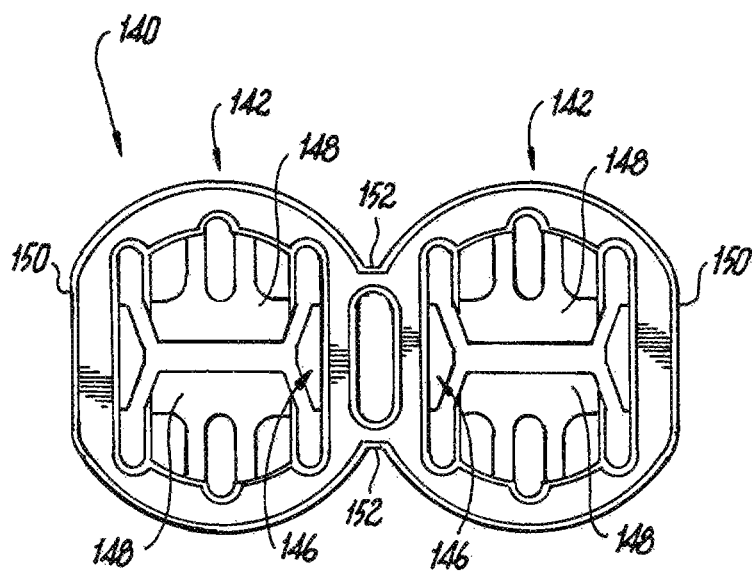
FIG. 55 is rear plan view of the cable clamp assembly of FIG. 53.
Figure 56:
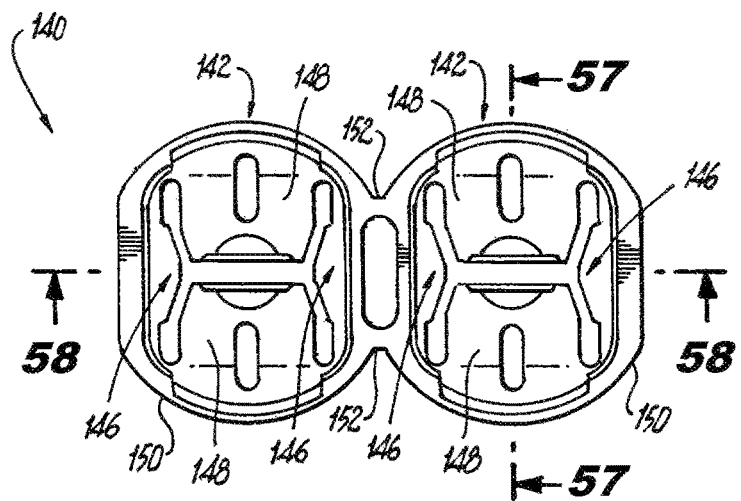
FIG. 56 is front plan view of the cable clamp assembly of FIG. 53.
Figure 57:
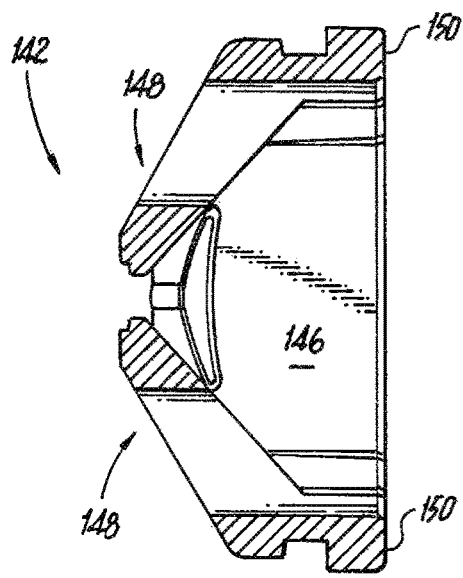
FIG. 57 is a cross-sectional view of the cable clamp assembly of FIG. 56 taken along line 57-57.
Figure 58:
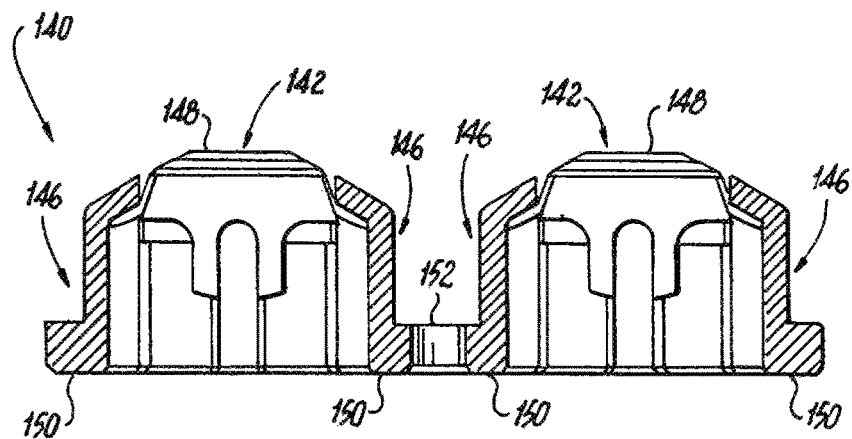
FIG. 58 is a cross-sectional view of the cable clamp assembly of FIG. 56 taken along line 58-58

Turning to FIGS. 30-36, an exemplary embodiment of a single gang electrical switch box assembly according to the present disclosure is shown. In this exemplary embodiment, the single gang box is a 2×4 electrical switch box 210, however any suitable size electrical box may be used for the present disclosure. For example, multi-gang boxes, such as a 2 gang or 3 gang switch boxes, may be used for the electrical box 210 of the present disclosure. The electrical box 210 has four sides 210a-210d and a bottom 210e, as shown in FIGS. 30-32. Similar to the electrical box 110, the electrical box 210 can be fabricated from metal, e.g., steel or galvanized steel, or from non-metallic materials, such as plastic. An example of a suitable plastic material is injection molded thermoplastic. Further, the depth of the electrical box 210 may vary. For example, the electrical box may be 1¼ inches, 1½ inches, 2⅛ inches, or 3½ inches in depth. The electrical box 210 may also include one or more mounting tabs 212 with threaded or tapped mounting holes, where threaded screws (e.g., 6/32 machine screws) can be inserted to secure an electrical device, such as a switch or receptacle, to the electrical box 210. The electrical box 210 may also include one or more cable entrance pry-outs 216 (seen in FIG. 30) that when removed create an opening in the electrical box 210 to secure one or more cable clamp assemblies 50 to the electrical box. The pry-outs 216 may be conventional size pry-outs commonly found in metallic electrical boxes, or the pry-outs may be configured and dimensioned larger than conventional pry-outs to accommodate a larger size cable clamp assembly 50. In the exemplary embodiment of FIG. 30, the pry-outs 216 are oversized to accommodate the cable clamp assembly 50. Further, the pry-outs 216 may be in any shape, e.g., oval, elliptical, circular or in the pseudo-square shape shown in FIG. 30 where the side walls are straight and the top and bottom walls are arched. As noted above, the shape of the cable clamp assembly 50 should be such that the cable clamps 52 fit into the pry-outs as shown in FIG. 31. The electrical box 210 may also include one or more knock-outs 218 that can be used to secure other cable clamps, e.g., cable clamps 10, to the electrical box.

Referring to FIGS. 33-36, installing a cable clamp assembly 50 of the present disclosure into the electrical box 210 from outside the electrical box will be described. To mount the cable clamp assembly 50 to the electrical box, the two pry-outs 216 (seen in FIG. 30) are removed from the electrical box 210 to provide two openings in side 210a. The guides 60 and fingers 62 of the cable clamps 52 are then inserted into the openings. As the camming surfaces 64a of the snap-in tabs 64 engage the side 210a, the fingers 62 and snap-in tabs 64 flex inwardly toward the respective hollow center opening 56 or 58 of the frame 54 until the snap-in tabs 64 pass through the openings in the side 210a. When the snap-in tabs 64 pass through the openings in the side 210a, the force applied by the side 210a against the tabs 64 is removed so that the tabs return (or snap back) to their normal, unflexed position. At this point, the snap-in tabs 64 are on the inside of the electrical box 210 with an outside facing wall 64b (seen in FIGS. 33 and 34) resting against an inside surface of side 210a. In addition, an inside facing wall 54a (seen in FIGS. 23 and 36) of the frame 54 engages an outside surface of the side 210a to prevent the cable clamp assembly 50 from passing through the openings in the side 210a and into the electrical box 210. With this snap-in fit, the snap-in tabs and the frame releasably secure the cable clamp assembly 50 to the electrical box 210.

Turning to FIGS. 37-40, an exemplary embodiment of a multi-gang electrical box assembly according to the present disclosure is shown. In this exemplary embodiment, the multi-gang box is a 4×4 electrical square box 250, which is similar to the 4×4 square box described above, except that pry-outs 216 are shown instead of knock-outs. The cable entrance pry-outs 216 when removed create two openings in the electrical box 250 and are used to secure one or more cable clamp assemblies 50 to the electrical box (seen in FIGS. 37 and 40), and to permit electrical cables to be inserted through the cable clamps 52 into the electrical box (seen in FIGS. 38 and 39). The pry-outs 216 are similar to the pry-outs described above. Installation of the cable clamp assembly 50 is similar to the process described above. Once the cable clamp assemblies are installed in the electrical box 250, one or more electrical cables 500 can be inserted through the cable clamps 52 into the electrical box such that the free ends 62b of the fingers 62 flex imparting little resistance to the forward advancement of the cable 500 within the cable clamp 52, and to engage the electrical cable imparting sufficient resistance to rearward movement of the cable to prevent easy withdrawal of the cable from the cable clamp 52.

Referring to FIGS. 41-46, another exemplary embodiment of a cable clamp assembly 140 according to the present disclosure is shown. In this exemplary embodiment, the cable clamp assembly 140 includes two cable clamps 142, each having a base 144, a pair of guides 146, a pair of fingers 148 and one or more clamp holding members 150. The base 144, guides 146, and fingers 148 are similar to the base, guides and fingers described above, such that a description of each is not repeated. In this exemplary embodiment, two clamp holding members 150 are secured to or integrally formed into the base 144 adjacent to each guide 146. To join the two cable clamps 142, a clamp holding member 150 for each cable clamp 142 are secured to each other or integrally formed a single component at, for example, bridge 152, seen in FIGS. 43 and 44.

Referring to FIGS. 47-58, additional exemplary embodiments of a cable clamp assembly 140 according to the present disclosure are shown. In these exemplary embodiments, the cable clamp assembly 140 includes two cable clamps 142, each having a base 144, a pair of guides 146, a pair of fingers 148 and a clamp holding member 150. The base 144, guides 146, and fingers 148 are similar to the base, guides and fingers described above and a description of each is not repeated. In each of these exemplary embodiments, the clamp holding member 150 extends around the entire perimeter of the base 144. To join the two cable clamps 142, the clamp holding member 150 for each cable clamp 142 are secured to each other or integrally formed or molded as a single component at bridge 152.

In one embodiment, the base 144, guides 146, fingers 148 and clamp holding member 150 can be formed as a single structure made of a polymeric or plastic material, such as injection molded thermoplastic. In another embodiment, the base 144, guides 146, fingers 148 and clamp holding member or members 150 can be formed as separate structures made of a polymeric or plastic material, such as injection molded thermoplastic, and the guide, fingers and clamp holding member or members are secured to the frame by welding, e.g., sonic welding.

Figure 59:
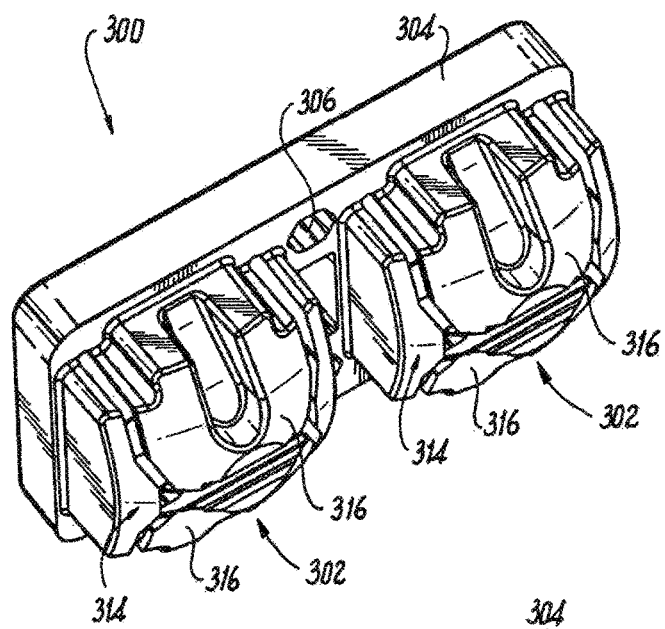
FIG. 59 is a front side perspective view of another exemplary embodiment of a cable clamp assembly according to the present disclosure.
Figure 60:
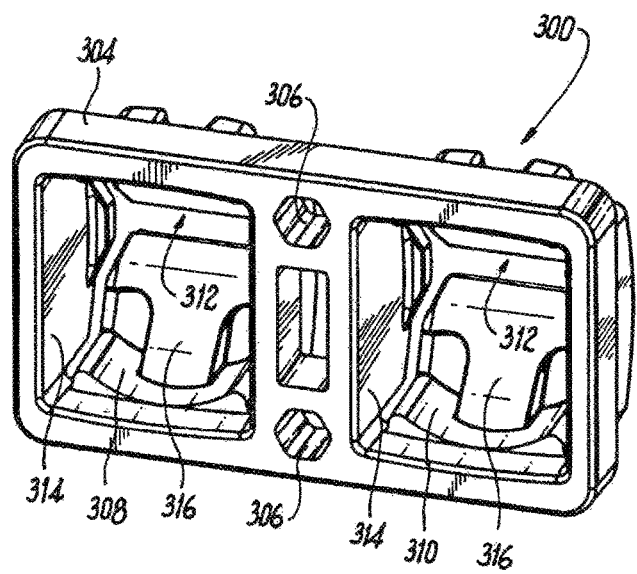
FIG. 60 is a rear perspective view of the cable clamp assembly of FIG. 59.
Figure 61:
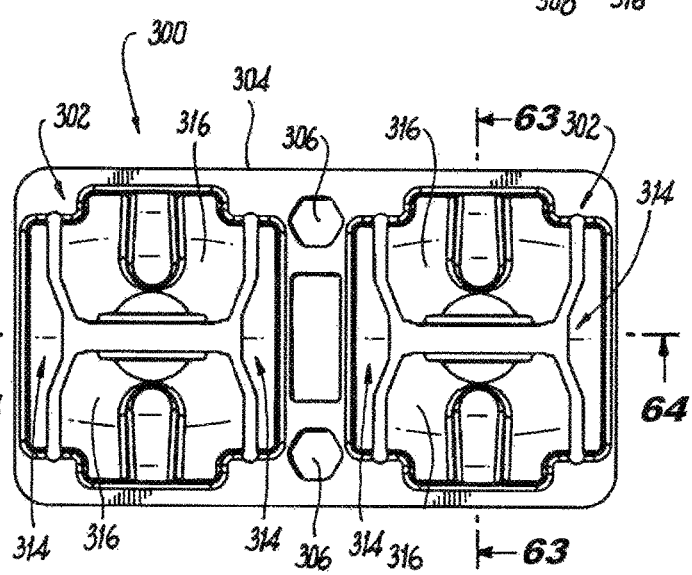
FIG. 61 is front plan view of the cable clamp assembly of FIG. 59.

Referring to FIGS. 59-64, another exemplary embodiment of a cable clamp assembly according to the present disclosure is shown. The cable clamp assembly 300 is configured to fit within an electrical box adjacent to pry-outs in a side wall of the electrical box, as will be described in more detail below. In this exemplary embodiment, the cable clamp assembly 300 has two cable clamps 302 that share a common frame 304 so that the cable clamps are positioned side-by-side, as shown in FIGS. 59-61. The frame 304 includes mounting apertures 306 used for securing the cable clamp assembly 300 to an electrical box. Referring to FIG. 60, the frame 304 also includes a pair of hollow openings 308 and 310, each sufficient to allow an electrical cable to pass through the cable clamp 302, as will be described in more detail below. Each cable clamp 302 has a gripping area 312 (seen in FIGS. 60 and 61) where an electrical cable can be gripped by the cable clamp 302 in such a way as to impart little resistance to the forward advancement of an electrical cable within the cable clamp 302, and to engage the electrical cable imparting sufficient resistance to rearward movement of the cable to prevent easy withdrawal of the cable from the cable clamp 302.

Figure 62:
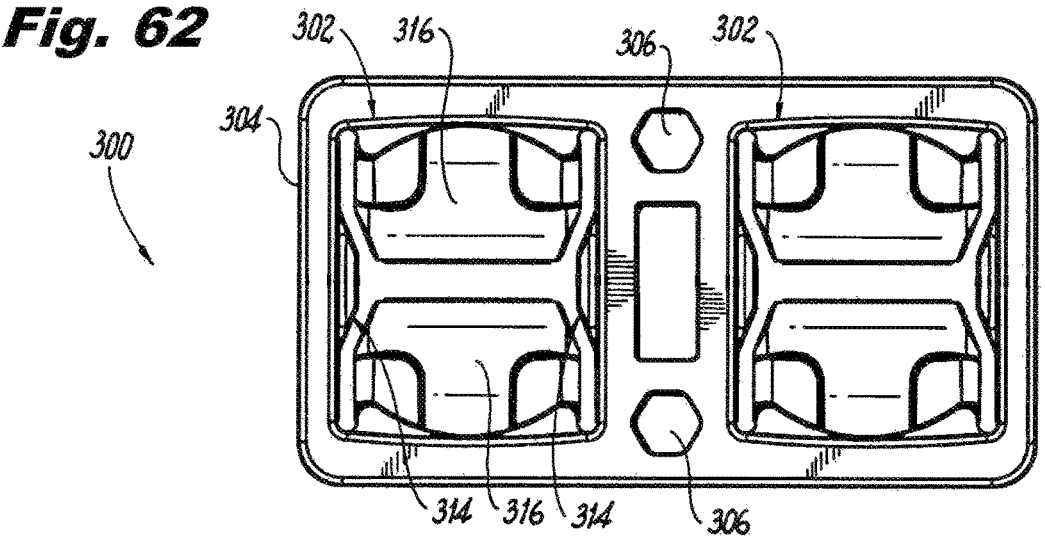
FIG. 62 is rear plan view of the cable clamp assembly of FIG. 59.
Figure 63:
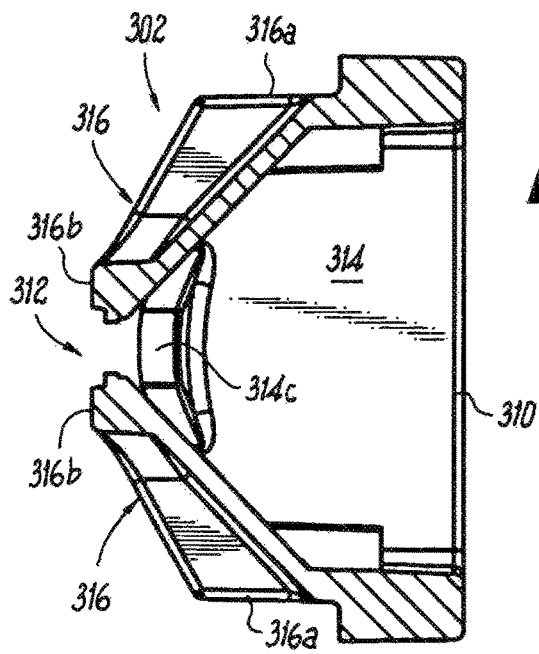
FIG. 63 is a cross-sectional view of the cable clamp assembly of FIG. 62 taken along line 63-63.
Figure 64:
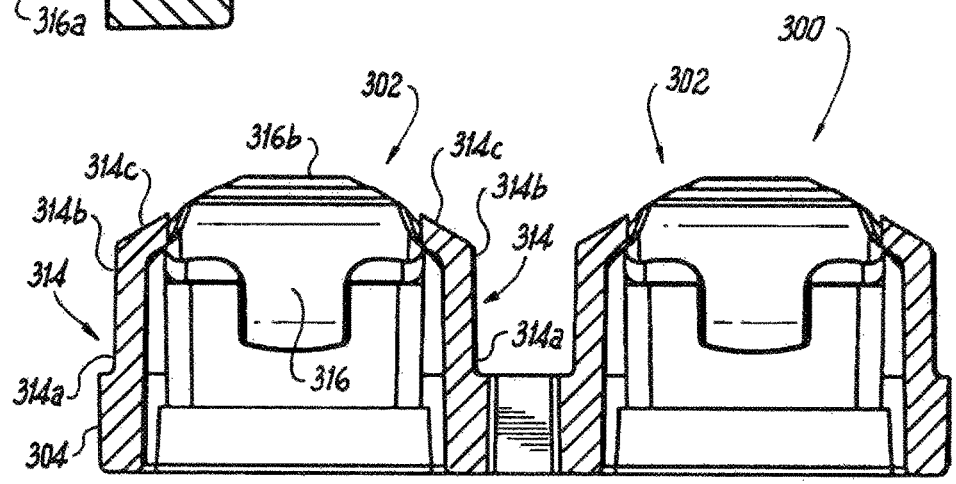
FIG. 64 is a cross-sectional view of the cable clamp assembly of FIG. 62 taken along line 64-64

Referring to FIGS. 62-64, each cable clamp 302 includes a pair of cable guide members (also called "guides") 314, and a pair of clamp members (also called "fingers") 316 that are secured to the frame and are flexible relative to the frame. The guides 314 have a first end 314a (seen in FIG. 64) secured to or integrally formed into the frame 304, and a second end 314b as a free end (seen in FIGS. 59 and 64). At least the free end 314b of each guide 314 includes a pressure tab 314c positioned in the gripping area 312 so as to help guide an electrical cable passing through the hollow center opening 308 or 310 of the frame 304 within the respective gripping area 312. One skilled in the art would readily appreciate that the pressure tabs 314c can extend along the length of the guide 314. The fingers 316 have a first end 316a secured to or integrally formed into the frame 304, and a second end 316b as a free end. The free end 316b of each finger 316 is positioned to extend into the gripping area 312 (seen in FIG. 63). The area in the hollow center opening of each cable clamp 302 where the free ends 314b of the guides 314 and the free ends 316b of the fingers 316 converge forms the respective gripping area 312, where the free ends 316b of the fingers 316 are capable of gripping an electrical cable that is passed through the hollow center opening 308 or 310 of the frame 304 and between the free ends 316b of the fingers 316. The free ends 316b of the fingers 316 are positioned and shaped, e.g., tapered, so as to flex imparting little resistance to the forward advancement of the cable within the cable clamp 302, and to engage the electrical cable imparting sufficient resistance to rearward movement of the cable to prevent easy withdrawal of the cable from the cable clamp.

In one embodiment, the frame 304, guides 314, and fingers 316 can be formed as a single structure made of a polymeric or plastic material, such as injection molded thermoplastic. In another embodiment, the frame 304, guides 314 and fingers 316 can be formed as separate structures made of a polymeric or plastic material, such as injection molded thermoplastic, and the guide and fingers are secured to the frame by welding, e.g., sonic welding. Further, one skilled in the art would readily recognize that the guides 314 can be replaced with fingers 316 such that an electrical cable within the cable clamps 302 is engaged by each finger.

Figure 65:
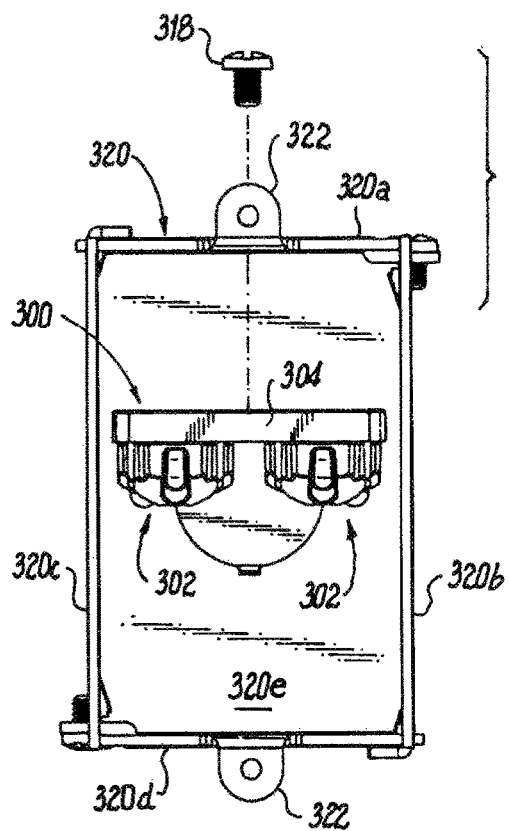
FIG. 65 is a top plan view of an electrical box with the cable clamp assembly of FIG. 59 positioned for installation into the electrical box.
Figure 66:
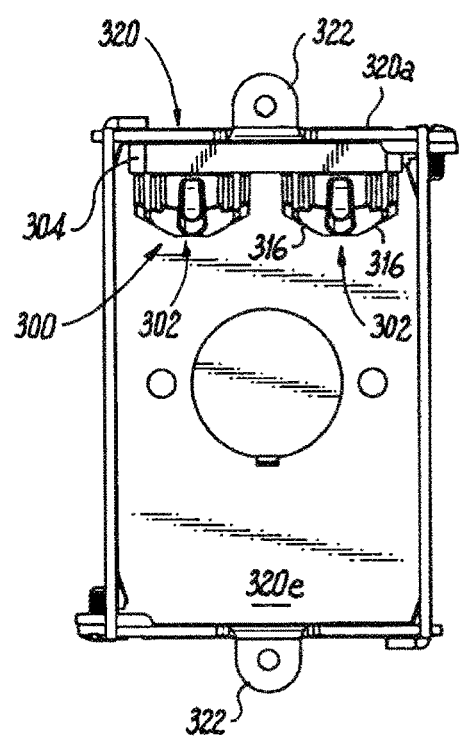
FIG. 66 is a top plan view of an electrical box with the cable clamp assembly of FIG. 65 installed into the electrical box.
Figure 67:
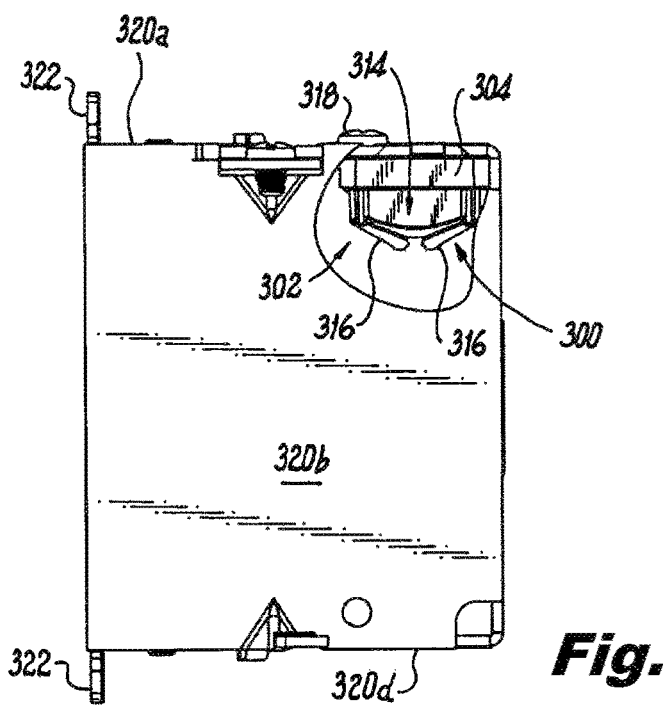
FIG. 67 is a side elevation view of the electrical box of FIG. 66 with a portion of the box cut away to reveal a portion of the cable clamp assembly.
Figure 68:
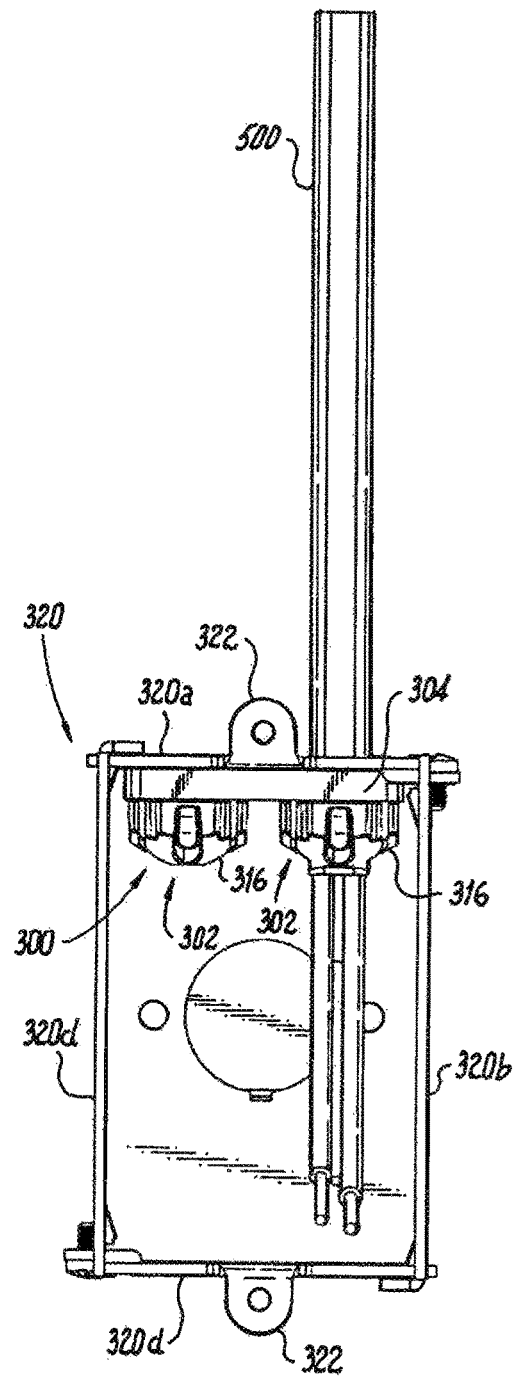
FIG. 68 is a top plan view of the electrical box of FIG. 66 with an electrical cable installed into the cable clamp assembly.
Figure 69:
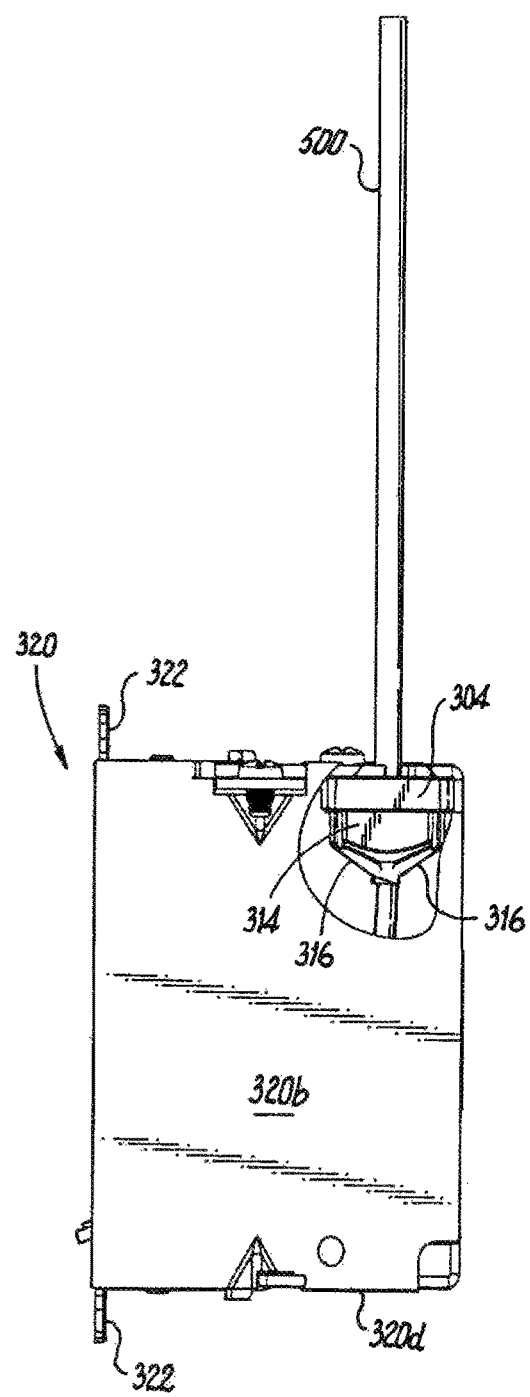
FIG. 69 is a side elevation view of the electrical box of FIG. 68 with a portion of the box cut away to reveal a portion of the cable clamp assembly and a portion of the electrical cable installed into the cable clamp assembly.
Figure 70:
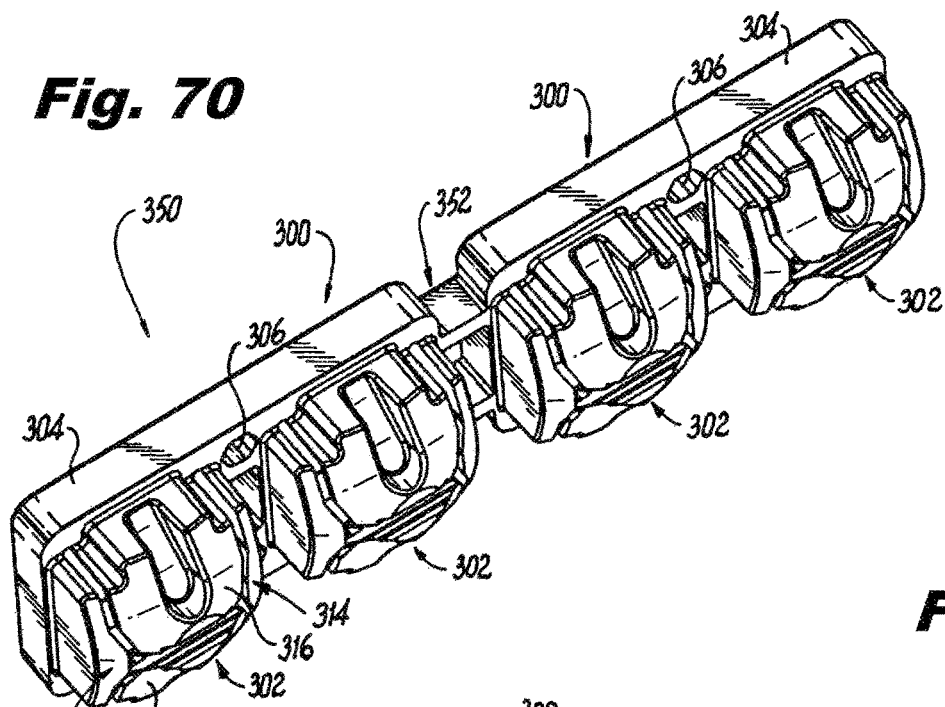
FIG. 70 is a front side perspective view of another exemplary embodiment of a cable clamp assembly according to the present disclosure.
Figure 71:
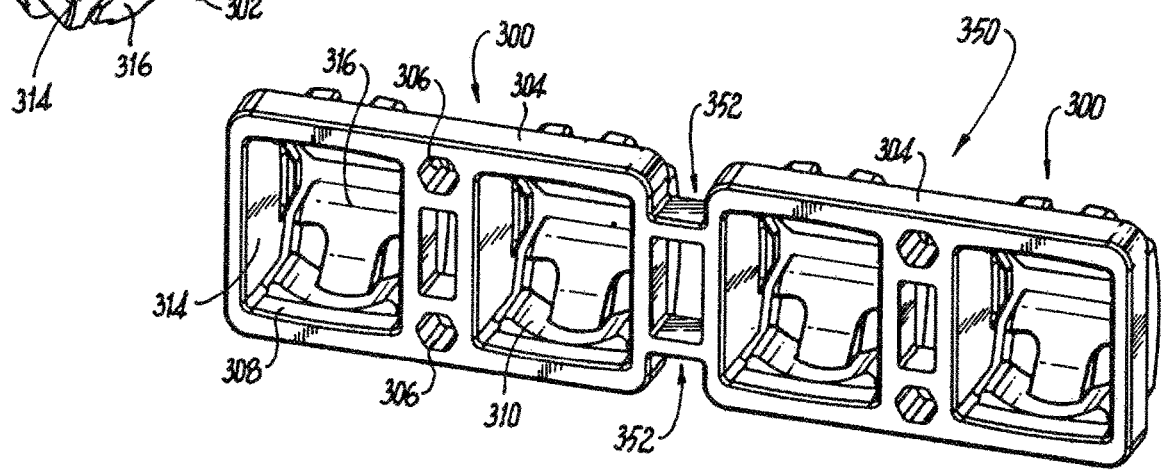
FIG. 71 is a rear perspective view of the cable clamp assembly of FIG. 70.
Figure 72:
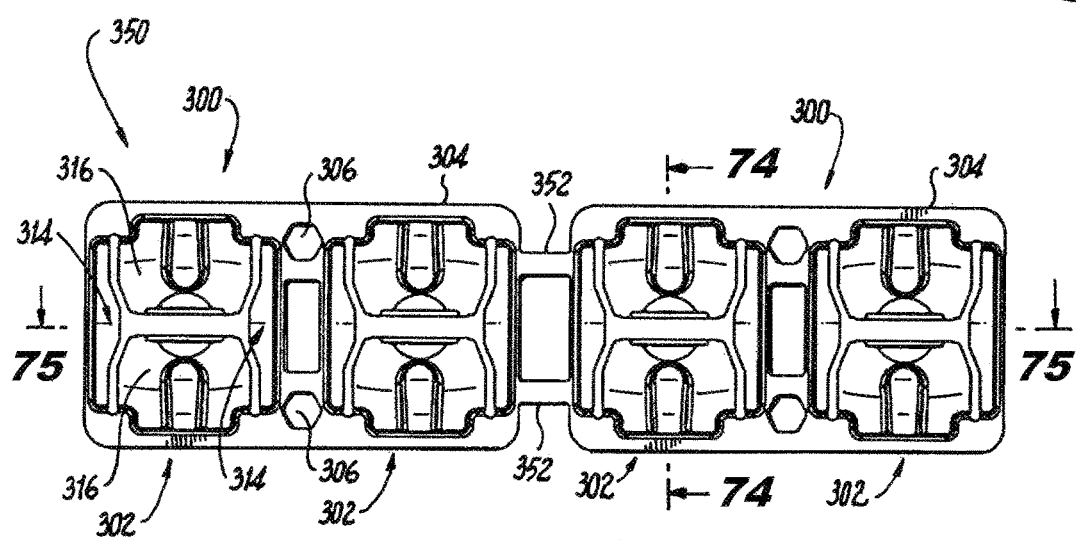
FIG. 72 is front plan view of the cable clamp assembly of FIG. 70.
Figure 73:
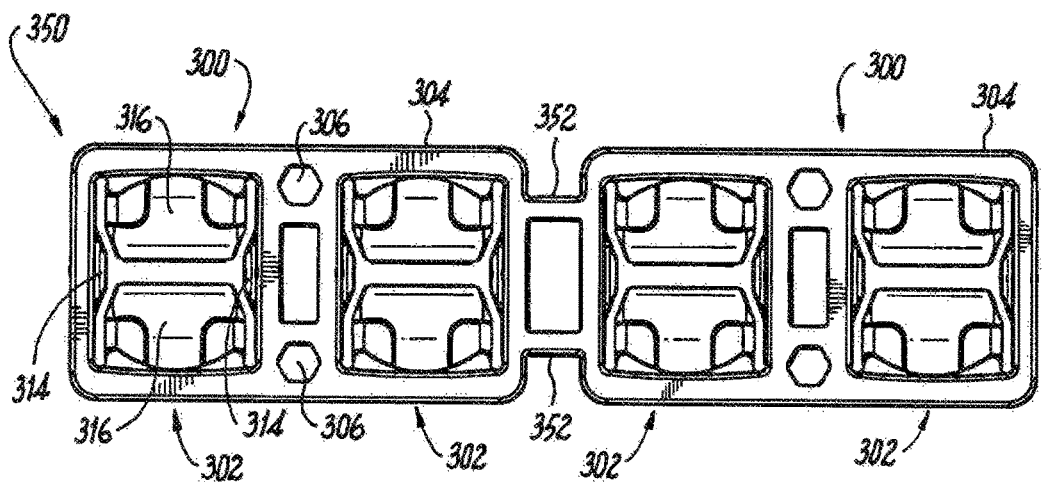
FIG. 73 is rear plan view of the cable clamp assembly of FIG. 70.
Figure 74:
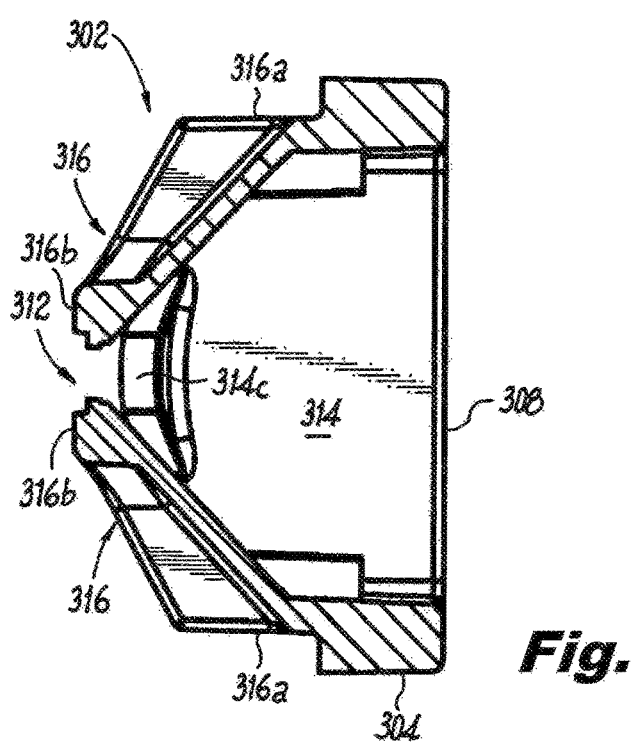
FIG. 74 is a cross-sectional view of the cable clamp assembly of FIG. 73 taken along line 74-74.
Figure 75:
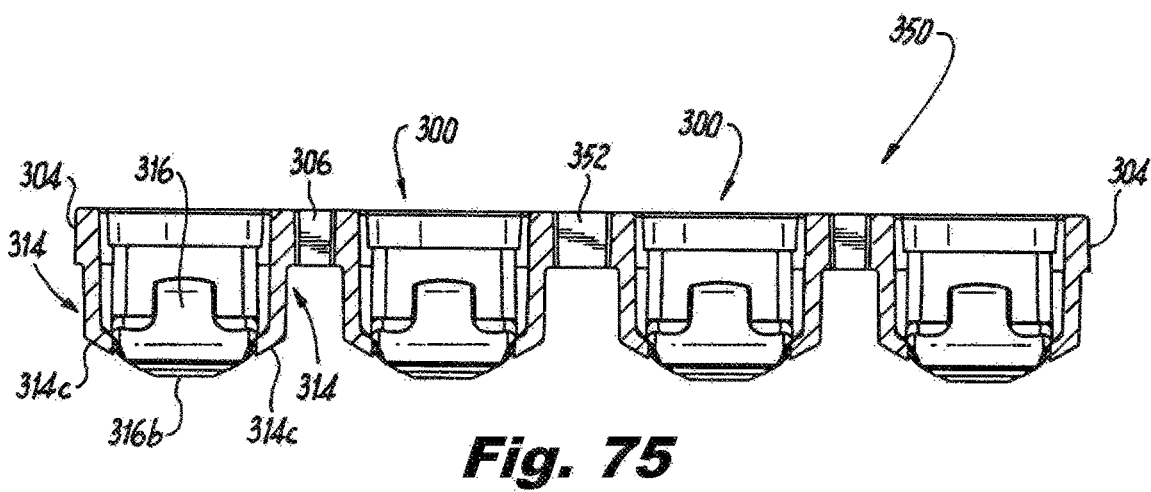
FIG. 75 is a cross-sectional view of the cable clamp assembly of FIG. 73 taken along line 75-75.

Turning to FIGS. 65-67, an exemplary embodiment of a single gang electrical switch box assembly according to the present disclosure is shown. In this exemplary embodiment, the single gang box is a 2×4 electrical switch box 320, however any suitable size electrical box may be used for the present disclosure. For example, multi-gang boxes, such as a 2 gang or 3 gang switch boxes, may be used for the electrical box 320 of the present disclosure. The electrical box 320 has four sides 320a-320d and a bottom 310e, as shown in FIGS. 65-67. Similar to the electrical box 210, the electrical box 320 can be fabricated from metal, e.g., steel or galvanized steel, or from non-metallic materials, such as plastic. An example of a suitable plastic material is injection molded thermoplastic. Further, the depth of the electrical box 320 may vary. For example, the electrical box may be 1¼ inches, 1½ inches, 2⅛ inches, or 3½ inches in depth. The electrical box 320 may also include one or more mounting tabs 322 with threaded or tapped mounting holes, where threaded screws (e.g., 6/32 machine screws) can be inserted to secure an electrical device, such as a switch or receptacle, to the electrical box 320. The electrical box 320 may also include one or more cable entrance pry-outs, similar to pry-outs 216 seen in FIG. 30, that when removed create an opening in the electrical box 320 to secure one or more cable clamp assemblies 300 to the electrical box. The pry-outs may be conventional size pry-outs commonly found in metallic electrical boxes, or the pry-outs may be configured and dimensioned smaller or larger than conventional pry-outs to permit one or more cables to pass through a side of the electrical box 320 and into the cable clamp assembly 300. In the exemplary embodiment of FIGS. 65-67, the pry-outs are conventional sized. Further, the pry-outs may be in any shape, e.g., oval, elliptical, circular or in the pseudo-square shape where the side walls are straight and the top and bottom walls are arched. The electrical box 320 may also include one or more knock-outs that can be used to secure other cable clamps, e.g., cable clamps 10, to the electrical box.

Referring to FIGS. 65-69, installing a cable clamp assembly 300 of the present disclosure into the electrical box 320 will be described. To mount the cable clamp assembly 300 to the electrical box, at least one of the two pry-outs on a side, e.g., side 320a, of the electrical box 320 are removed to provide at least one opening in the side. The cable clamp assembly 300 is positioned within the electrical box 320 so that the frame 304 is positioned to rest against the side 320a. A fastener 318, e.g., a set screw, is then passed through an aperture in the side 320a and inserted into one of the apertures 306 (seen in FIG. 61) in the frame 304 and tightened to releasably secure the cable clamp assembly 300 within the box, as shown in FIGS. 66 and 67. With the cable clamp assembly 300 installed within the electrical box 320, a cable 500 can be passed through a pry-out opening aligned with a cable clamp 302 of the cable clamp assembly and through the gripping area 312 (seen in FIGS. 60 and 61) where the electrical cable can be gripped by the fingers 316 in the cable clamp such that the free ends 316b of the fingers 316 flex imparting little resistance to the forward advancement of the cable 500 within the cable clamp 302, and to engage the electrical cable imparting sufficient resistance to rearward movement of the cable to prevent easy withdrawal of the cable from the cable clamp.

Referring now to FIGS. 70-75, another exemplary embodiment of a cable clamp assembly according to the present disclosure is shown. The cable clamp assembly 350 is configured to fit within an electrical box adjacent to pry-outs on a side wall of the electrical box, as will be described in more detail below. In this exemplary embodiment, the cable clamp assembly 350 has two cable clamp assemblies 300 joined by a bridge support member 352. The cable clamp assemblies 300 are described above and for ease of description are not repeated. The bridge support member 352 may be integrally formed into each cable clamp assembly 300 such that the cable clamp assembly 350 is formed as a single assembly, or the bridge support member 352 can be secured to each cable clamp assembly 300 by welds, e.g., sonic welds, or adhesives or other suitable fasteners.

Figure 76:
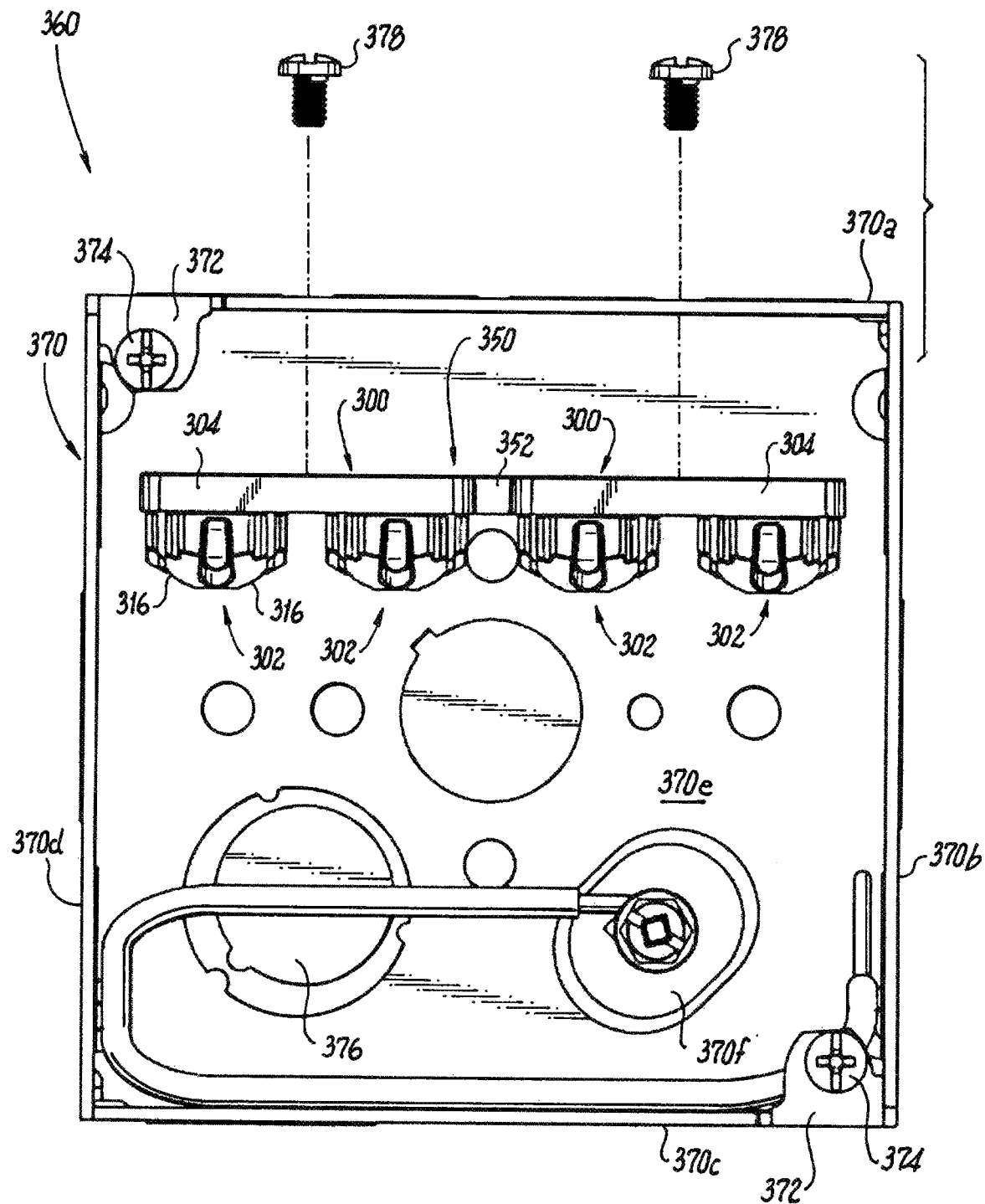
FIG. 76 is a top plan view of an electrical box with the cable clamp assembly of FIG. 70 positioned for installation into the electrical box.
Figure 77:
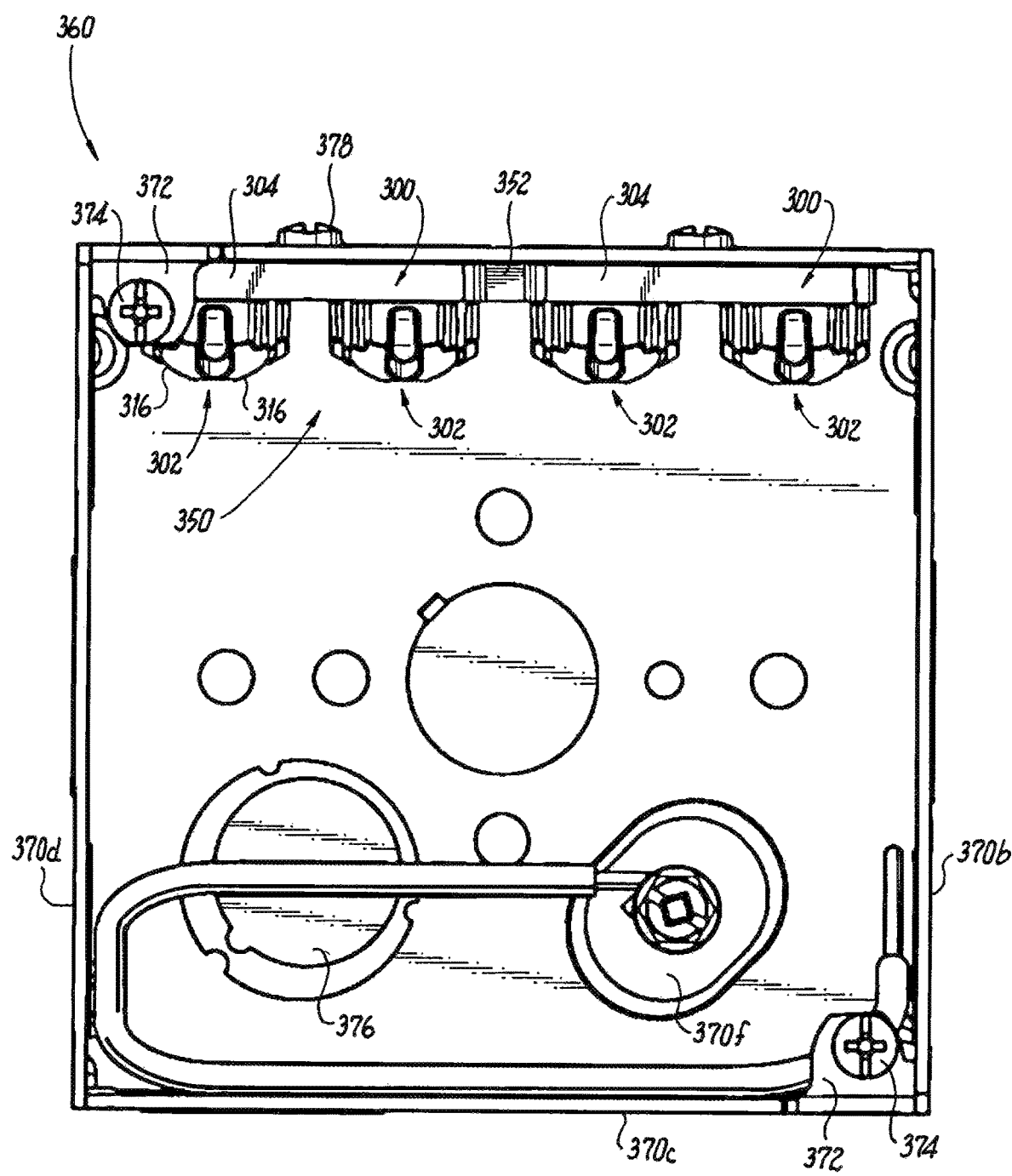
FIG. 77 is a top plan view of an electrical box with the cable clamp assembly of FIG. 70 installed into the electrical box.
Figure 78:
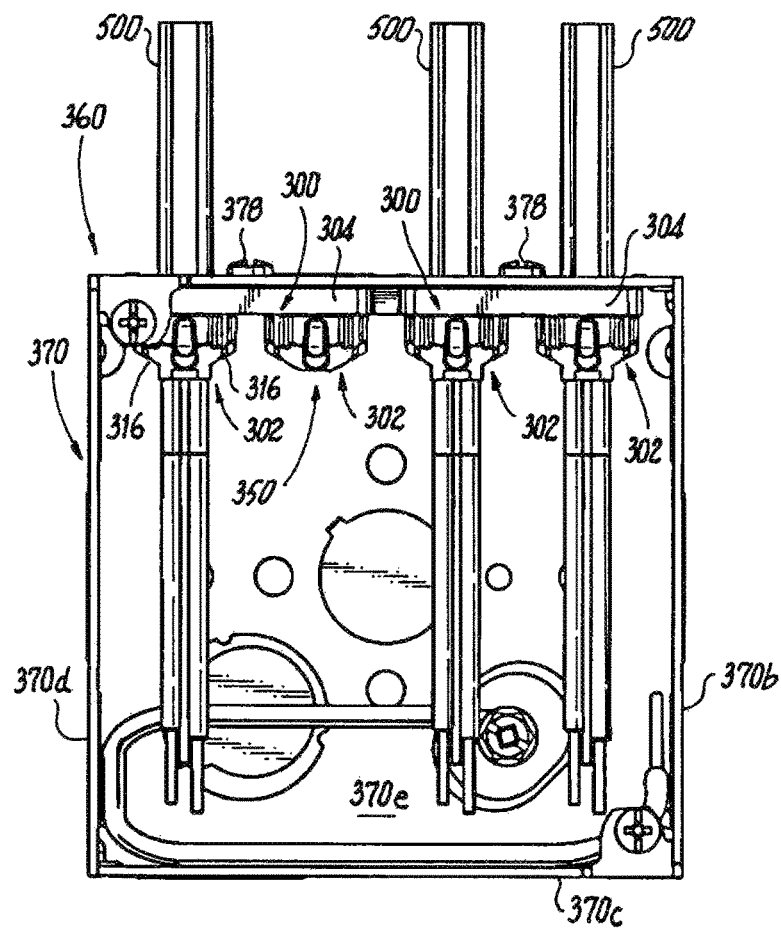
FIG. 78 is a top plan view of the electrical box of FIG. 77 with electrical cables installed into the cable clamp assembly.
Figure 79:
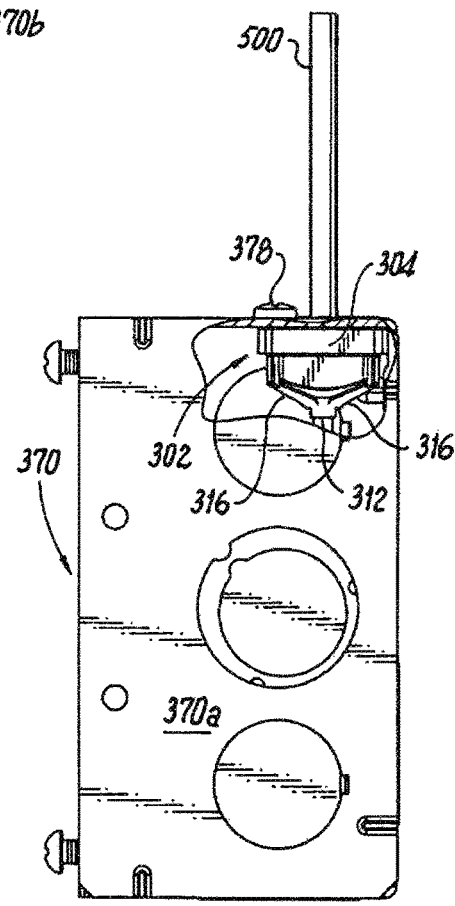
FIG. 79 is a side elevation view of the electrical box of FIG. 78 with a portion of the box cut away to reveal a portion of the cable clamp assembly and a portion of an electrical cable installed into the cable clamp assembly.
Figure 80:
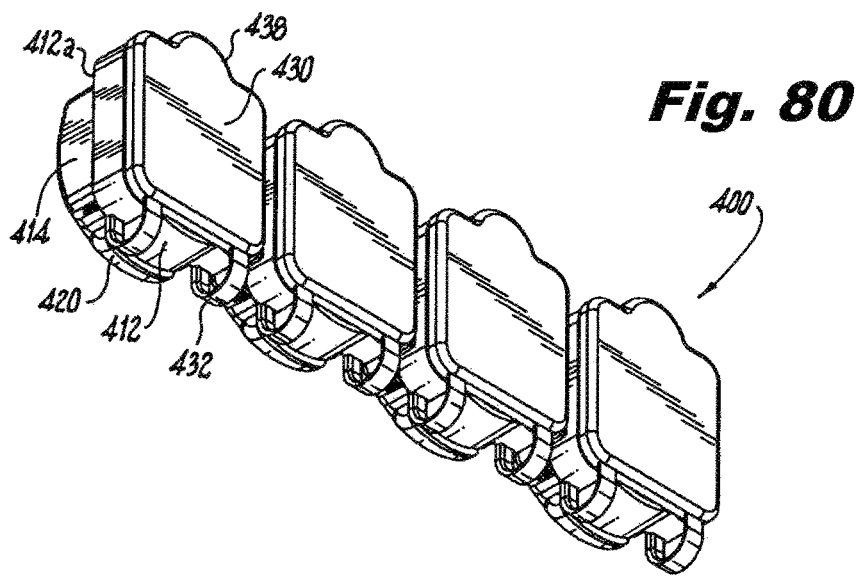
FIG. 80 is a rear side perspective view of another exemplary embodiment of a cable clamp assembly according to the present disclosure.
Figure 81:
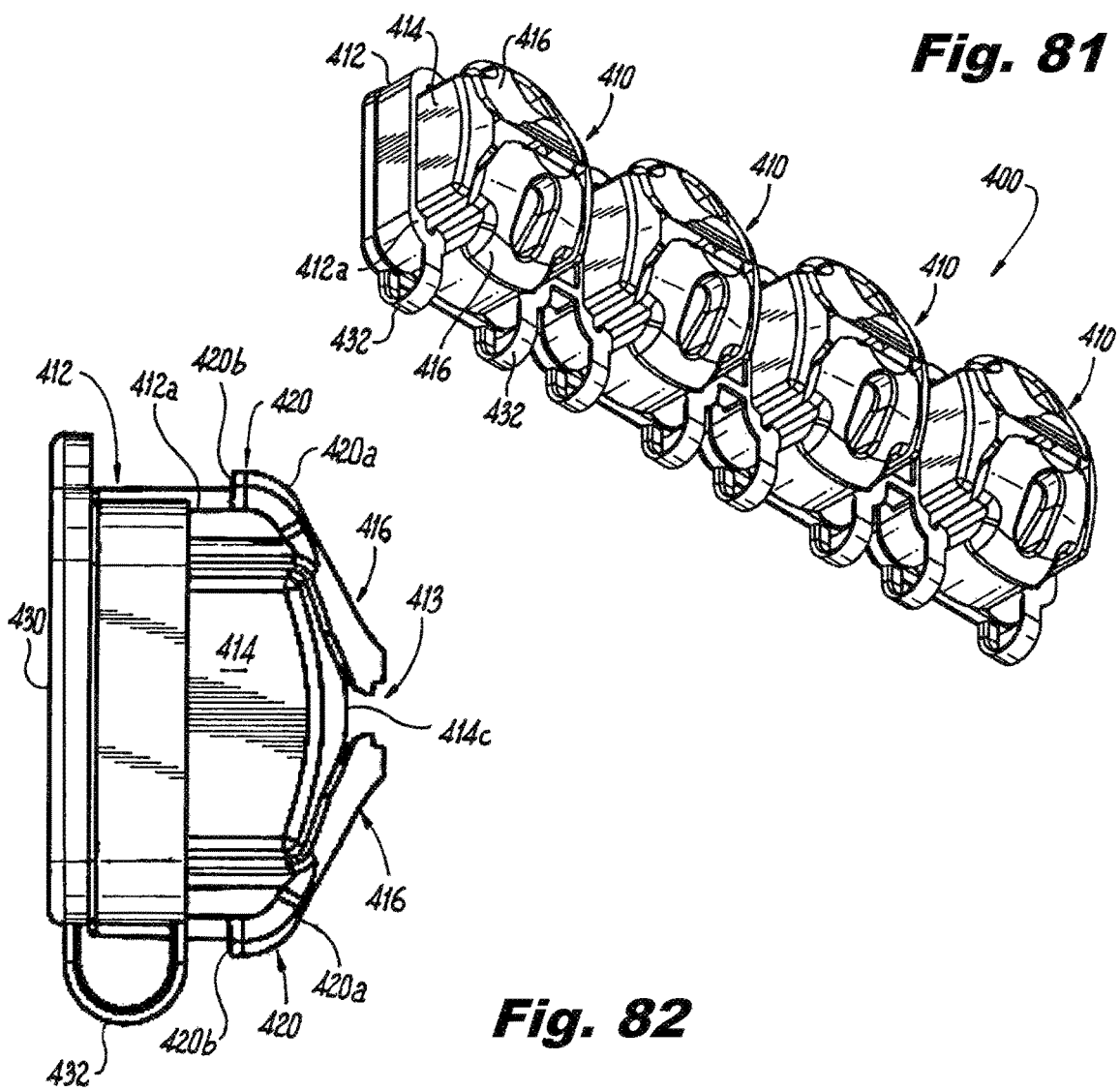
FIG. 81 is a front side perspective view of the cable clamp assembly of FIG. 80.

Turning to FIGS. 76 and 77, an exemplary embodiment of an electrical box assembly according to the present disclosure is shown. In this exemplary embodiment, the electrical box assembly 360 includes an electrical box 370 and the cable clamp assembly 350. The electrical box 370 has four sides 370a-370d and a bottom 370e. The electrical box 370 can be fabricated from metal, e.g., steel or galvanized steel, or from non-metallic materials, such as plastic. An example of a suitable plastic material is injection molded thermoplastic. In the embodiment shown, the electrical box 370 is a conventional 4×4 square box (or what is also known in the industry as a 4" square box or a 1900 box), however any suitable sized electrical box may be used for the present disclosure. For example, single gang and additional multi-gang boxes, such as a 3-gang box or raceways, may be used for the electrical box of the present disclosure. Further, the depth of the electrical box 370 may vary. For example, the electrical box may be 1¼ inches, 1½ inches, 2⅛ inches, or 3½ inches in depth. The electrical box 370 may also include one or more mounting tabs 372 with threaded or tapped mounting holes, where threaded screws 374 (e.g., 8/32 machine screws) can be inserted to secure a cover, e.g., a blank cover, a switch cover or a receptacle cover, or to secure an extension ring or plaster ring to the electrical box 370. The electrical box 370 also includes one or more cable entrance pry-outs that when removed create an opening in the electrical box 370 to permit electrical cables to be inserted into the electrical box 370. The pry-outs may be conventional size pry-outs commonly found in metallic electrical boxes, or the pry-outs may be configured and dimensioned smaller or larger than conventional pry-outs to permit one or more cables to pass through a side of the electrical box 370 and into the cable clamp assembly 350. In the exemplary embodiment of FIGS. 76-79, the pry-outs are conventional sized. The electrical box 370 may also include one or more knock-outs 376 that when removed create an opening in the electrical box. To connect the electrical box 370 to electrical ground, a ground screw aperture may be included in the electrical box. In conventional 4×4 electrical boxes, the ground screw aperture is typically on a raised surface 370f of the bottom 370e of the electrical box 370, as seen in FIG. 76. The ground screw aperture is typically a threaded or tapped hole for insertion of a ground screw, e.g., an 8/32 machine screw, that is typically color coded as green.

Referring to FIGS. 76-79, installing the cable clamp assembly 350 into the electrical box 370 and one or more cables into the cable clamp assembly will be described. To mount the cable clamp assembly 350 to the electrical box, one or more of four pry-outs on a side, e.g., side 370a, of the electrical box 370 are removed to provide one or more openings in the side. The cable clamp assembly 350 is positioned within the electrical box 370 so that the frame 304 of each cable clamp assembly 300 is positioned to rest against the side 370a. Fastener 378, e.g., set screws, are then passed through apertures in the side 370a and inserted into one of the apertures 306 (seen in FIG. 73) in the frame 304 in each cable clamp assembly 300 and tightened to releasably secure the cable clamp assembly 350 within the box, as shown in FIGS. 76 and 77. With the cable clamp assembly 350 installed within the electrical box 370, one or more cables 500 can be passed through one or more pry-out opening aligned with a cable clamps 302 of the cable clamp assembly and through the gripping area 312 (seen in FIGS. 78 and 79) where the electrical cable can be gripped by the fingers 316 in the cable clamp such that the free ends 316b of the fingers 316 flex imparting little resistance to the forward advancement of the cable 500 within the cable clamp 302, and to engage the electrical cable imparting sufficient resistance to rearward movement of the cable to prevent easy withdrawal of the cable from the cable clamp.

Referring now to FIGS. 80-85, another exemplary embodiment of a cable clamp assembly according to the present disclosure is shown. The cable clamp assembly 400 is configured to fit within pry-outs on a side wall of the electrical box, as will be described in more detail below. In this exemplary embodiment, the cable clamp assembly 400 has four cable clamps 410 joined together by bridge support members 402 (seen in FIG. 84). The bridge support member 402 may be integrally formed into each cable clamp assembly such that the cable clamp 410 is formed as a single assembly, or the bridge support member 402 can be secured to each cable clamp 410 by welds, e.g., sonic welds, or adhesives or other suitable fasteners.

The cable clamps 410 according to this exemplary embodiment includes a base 412, a pair of cable guide members (also called "guides") 414, and a pair of cable clamp members (also called "fingers") 416 that are secured to the base and are capable of flexing relative to the base. The guides and fingers are substantially similar to the guides and fingers described above. Each cable clamp 410 has a gripping area 413 where an electrical cable is gripped by the cable clamp 410 in such a way as to impart little resistance to the forward advancement of an electrical cable within the cable clamp 410, and to engage the electrical cable imparting sufficient resistance to rearward movement of the cable to prevent withdrawal of the cable from the cable clamp 410.

In this exemplary embodiment, the base 412 for each cable clamp 410 is substantially square or rectangular in shape, and is configured to fit within a pry-out of an electrical box. The base 412 has a hollow center opening 418 (seen in FIG. 83) sufficient to allow an electrical cable to pass through the cable clamp 410, as will be described in more detail below. In addition, an inside facing wall 412a (seen in FIG. 81) of the frame 412 is provided to engage an outside surface of a side wall of an electrical box to prevent the cable clamp 410 from passing through the pry-out openings in the side wall of the electrical box. A cover 430 is movably secured to the base 412 via one or more hinges 432. One side of each hinge 432 may be integrally molded into the cover 430 or secured to the cover using adhesives or welds such as sonic welds. The other end of each hinge 432 may be integrally molded into the base 412 or secured to the base using adhesives or welds such as sonic welds. The cover 430 is movable between a closed position (seen in FIGS. 80 and 82) where access to the hollow center opening 418 of the base 412 is prevented, and an open position (seen in FIGS. 83-85) where access to the hollow center opening 418 of the base 412 is permitted. To maintain the cover 430 in the closed position, an inner surface 434 (seen in FIG. 83) of the cover may include one or more latching members 436. In the exemplary embodiment of FIGS. 80-85, the latching members 436 engage an interior wall 412b (seen in FIG. 83) of the base 412 and secure the cover in the closed position by friction fit. The cover 430 also include a tab 438 that facilitates opening of the cover.

Figure 82:
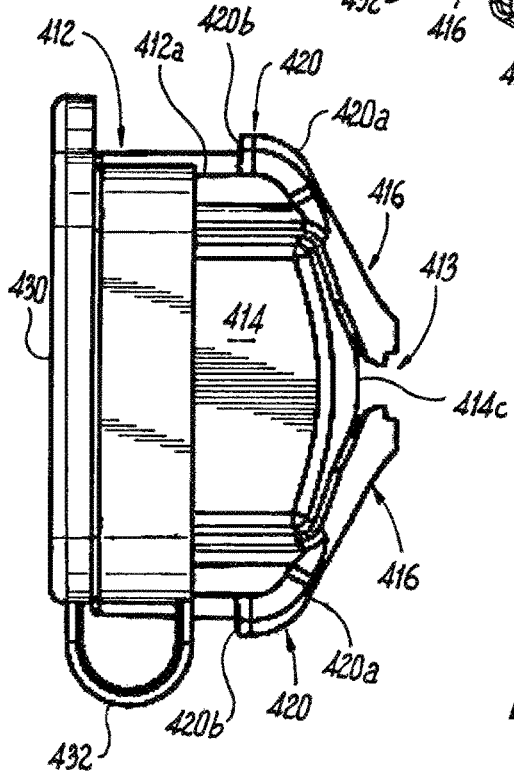
FIG. 82 is side elevation view of the cable clamp assembly of FIG. 80.
Figure 83:
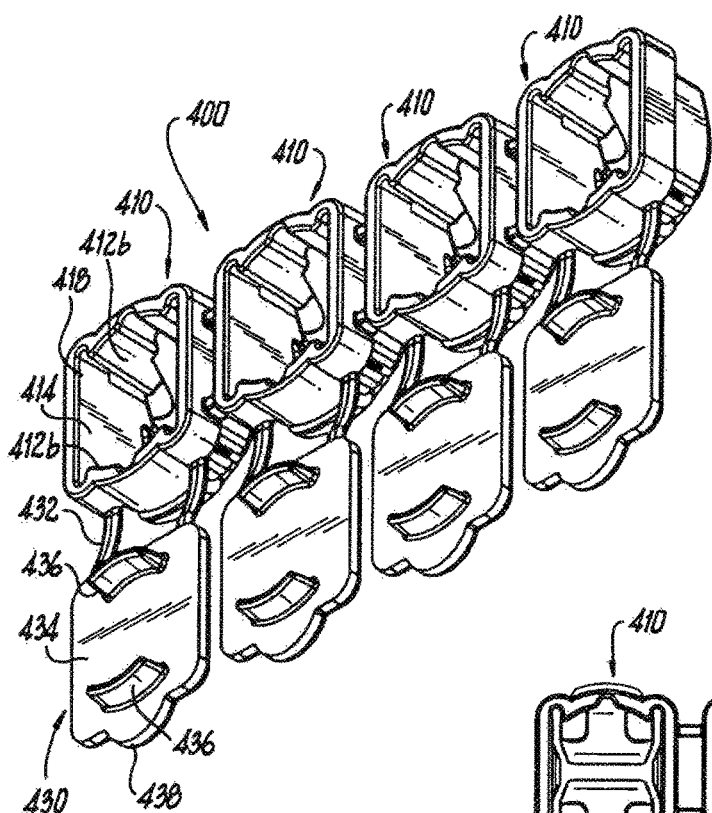
FIG. 83 is a rear side perspective view of the cable clamp assembly of FIG. 80 with covers in an open position.
Figure 84:
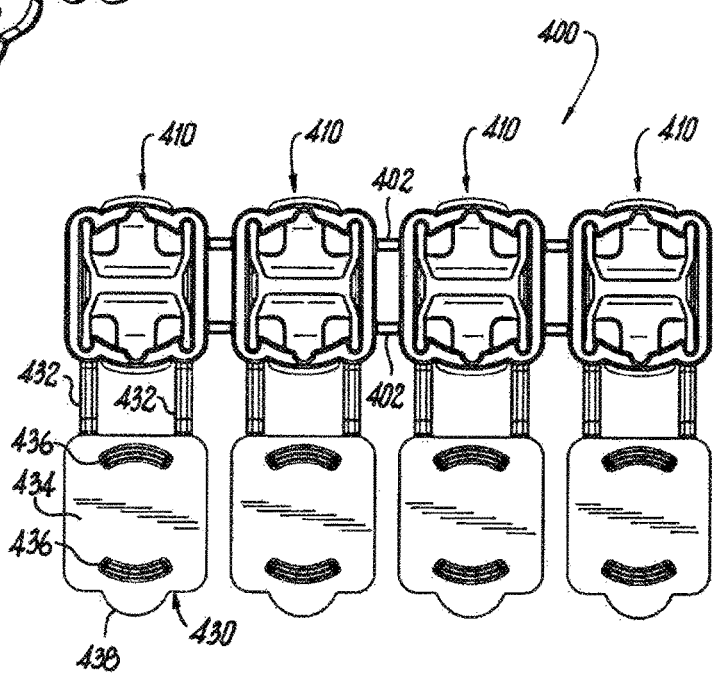
FIG. 84 is rear plan view of the cable clamp assembly of FIG. 83.
Figure 85:
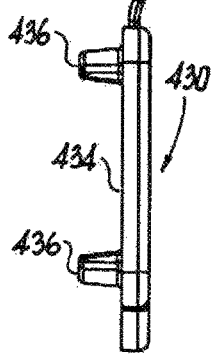
FIG. 85 is a side elevation view of the cable clamp assembly of FIG. 83.

As seen in FIGS. 82 and 85, the guides 414 have a first end 414a secured to or integrally formed into the base 412 and a second end 414b as a free end. At least the free end 414b of each guide 14 includes a pressure tab 414c positioned in the gripping area 413 so as to help guide an electrical cable passing through the hollow center opening 418 of the base 412. One skilled in the art would readily appreciate that the pressure tabs 414c can extend along the length of the guide 414. The fingers 416 have a first end 416a secured to or integrally formed into the base 412, and a second end 416b as a free end. The free end 416b of each finger 416 is positioned to extend into the gripping area 413. The area in the hollow center opening 418 of the base 412 where the free ends 414b of the guides 414 and the free ends 416b of the fingers 416 converge forms the gripping area 413 where the free ends 416b of fingers 416 are capable of gripping an electrical cable that is passed through the hollow center opening 418 of the base 412 and between the free ends 416b of the fingers 416. The free ends 416b of the fingers are positioned and shaped, e.g., tapered, so as to be able to flex imparting little resistance to the forward advancement of an electrical cable within the cable clamp 410, and to engage the electrical cable imparting sufficient resistance to rearward movement of the electrical cable to prevent easy withdrawal of the electrical cable from the cable clamp 410. In this exemplary embodiment, the first end 416a of each finger includes one or more snap-in tabs 420 used to releasable secure the cable clamp 410 to an electrical box. The snap-in tabs 420 have a camming surface (e.g., a rounded surface) 420a to facilitate the flexing of the fingers 416 and snap-in tabs 420 toward the hollow center opening 418 when inserting the cable clamp 410 into an electrical box, as will be described in more detail below.

In one embodiment, the base 412, guides 414 and fingers 416 can be formed as a single structure made of a polymeric or plastic material, such as injection molded thermoplastic. In another embodiment, the base 412, guides 414 and fingers 416 can be formed as separate structures made of a polymeric or plastic material, such as injection molded thermoplastic, and the guide and fingers are secured to the base by welding, e.g., sonic welding. Further, one skilled in the art would readily recognize that the guides 414 can be replaced with fingers 416 such that an electrical cable within the cable clamp 410 is engaged by each finger.

Figure 86:
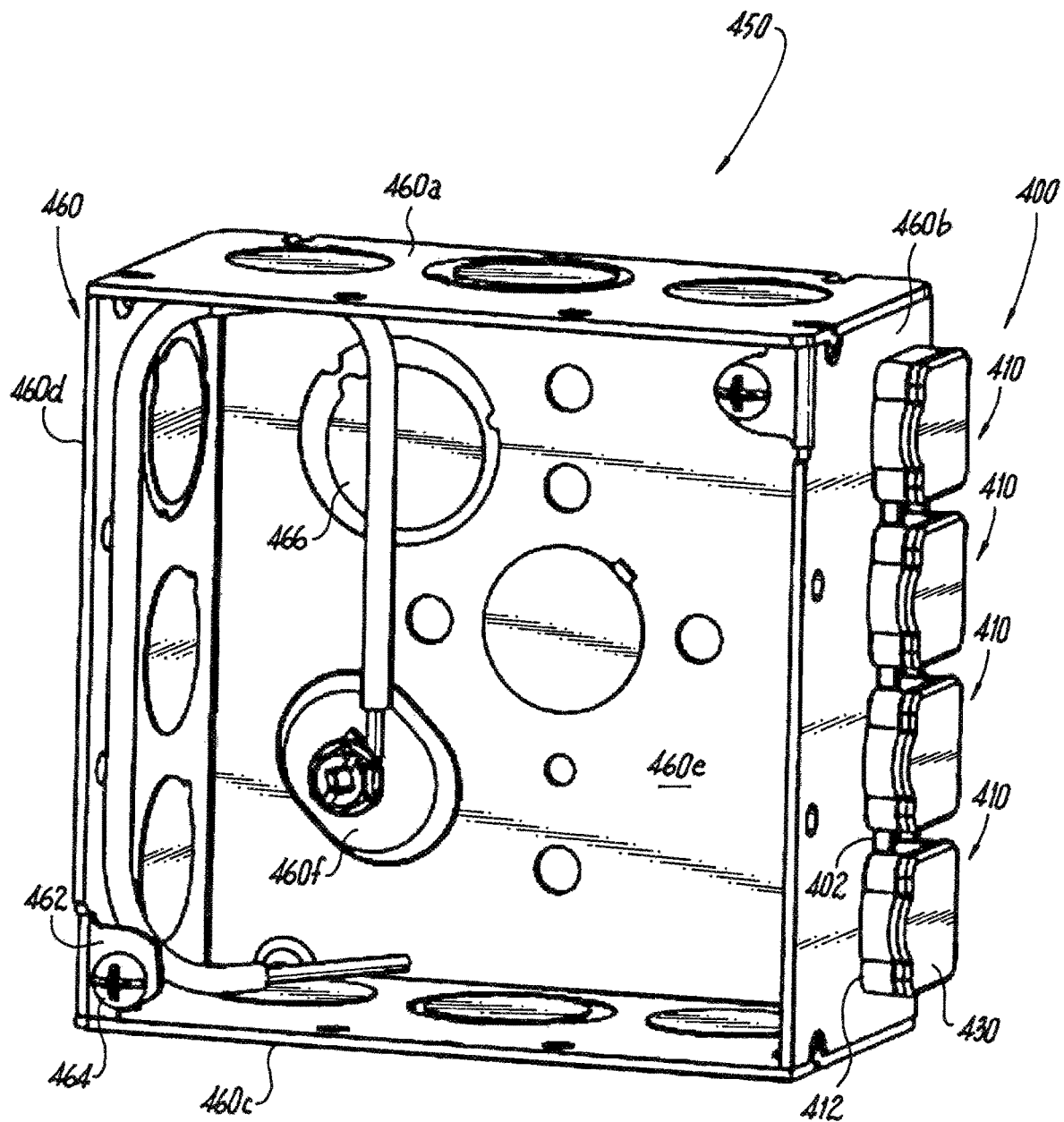
FIG. 86 is a front perspective view of an electrical box with the cable clamp assembly of FIG. 80 installed in the electrical box.
Figure 87:
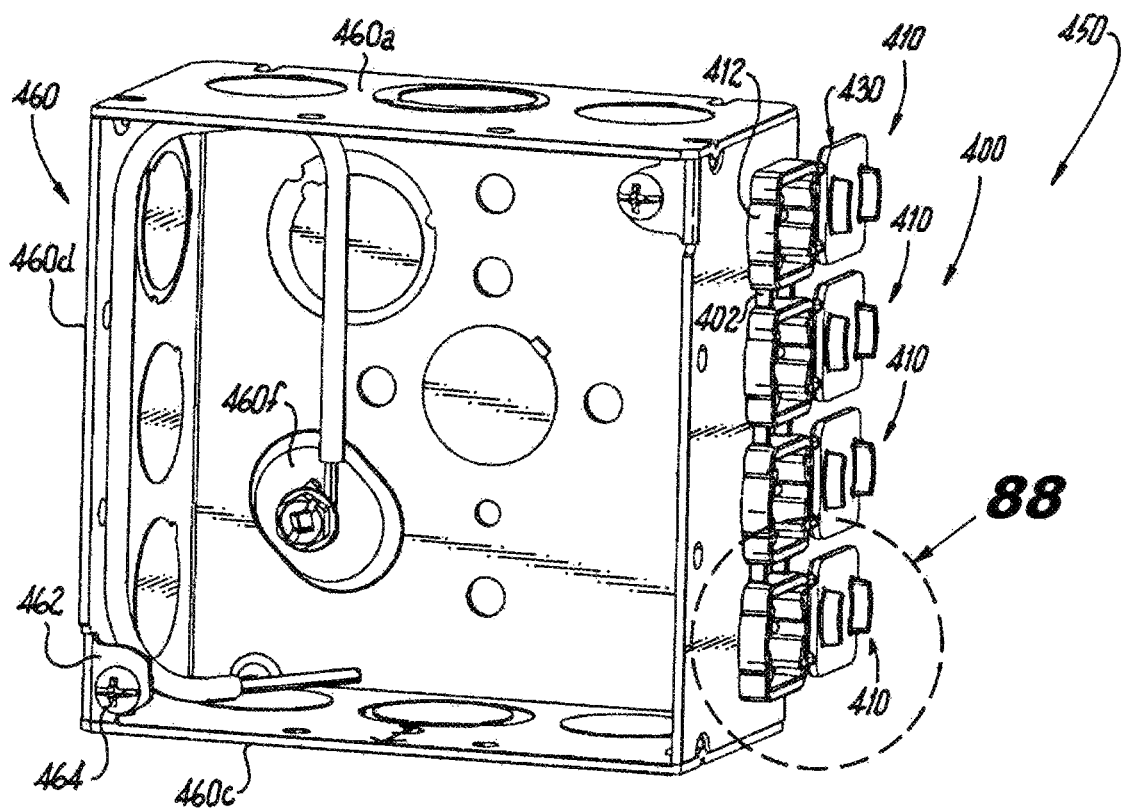
FIG. 87 is a front perspective view of an electrical box with the cable clamp assembly of FIG. 86 with the rear cover in the open position.
Figure 88:
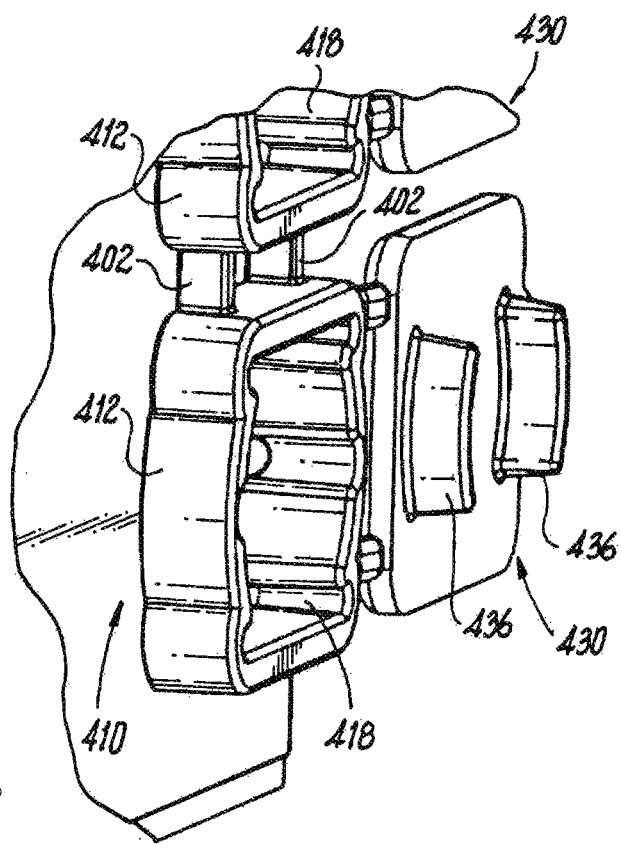
FIG. 88 is an enlarged view of a portion of the electrical box assembly of FIG. 87.

Turning to FIGS. 86-88, an exemplary embodiment of an electrical box assembly according to the present disclosure is shown. In this exemplary embodiment, the electrical box assembly 450 includes an electrical box 460 and the cable clamp assembly 400. The electrical box 460 has four sides 460a-460d and a bottom 460e. The electrical box 460 can be fabricated from metal, e.g., steel or galvanized steel, or from non-metallic materials, such as plastic. An example of a suitable plastic material is injection molded thermoplastic. In the embodiment shown, the electrical box 460 is a conventional 4×4 square box (or what is also known in the industry as a 4" square box or a 1900 box), however any suitable sized electrical box may be used for the present disclosure. For example, single gang and additional multi-gang boxes, such as a 3 gang box or raceways, may be used for the electrical box of the present disclosure. Further, the depth of the electrical box 460 may vary. For example, the electrical box may be 1¼ inches, 1½ inches, 2⅛ inches, or 3½ inches in depth. The electrical box 460 may also include one or more mounting tabs 462 with threaded or tapped mounting holes, where threaded screws 464 (e.g., 8/32 machine screws) can be inserted to secure a cover, e.g., a blank cover, a switch cover or a receptacle cover, or to secure an extension ring or plaster ring to the electrical box 460. The electrical box 460 also includes one or more cable entrance pry-outs that when removed create an opening in the electrical box 460 to permit electrical cables to be inserted into the electrical box. The pry-outs may be conventional size pry-outs commonly found in metallic electrical boxes, or the pry-outs may be configured and dimensioned smaller or larger than conventional pry-outs to permit one or more cables to pass through a side of the electrical box 460 and into the cable clamp assembly 450. In the exemplary embodiment of FIGS. 86-88, the pry-outs are larger than conventional sized pry-outs. The electrical box 460 may also include one or more knock-outs 466 that when removed create an opening in the electrical box. To connect the electrical box 460 to electrical ground, a ground screw aperture may be included in the electrical box. In conventional 4×4 electrical boxes, the ground screw aperture is typically on a raised surface 460f of the bottom 460e of the electrical box 460, as seen in FIGS. 86 and 87. The ground screw aperture is typically a threaded or tapped hole for insertion of a ground screw, e.g., an 8/32 machine screw, that is typically color coded as green.

Continuing to refer to FIGS. 86-88, installing the cable clamp assembly 450 into the electrical box 460 will be described. To mount the cable clamp assembly 400 to the electrical box, four pry-outs on a side, e.g., side 460b, of the electrical box 460 are removed to provide four openings in the side. The cable clamp assembly 400 is positioned so that the guides 414 and fingers 416 of each cable clamp 410 are inserted into a corresponding pry-out opening from an exterior of the electrical box. As the camming surfaces 420a of the snap-in tabs 420 engage the side 460b, the fingers 416 and snap-in tabs 420 flex inwardly toward the hollow center opening 418 of the base 412 until the snap-in tabs 420 pass through the openings in the side 460b. When the snap-in tabs 420 pass through the openings in the side 460b, the force applied by the side 460b against the tabs 420 is removed so that the tabs return (or snap back) to their normal, unflexed position. At this point, the snap-in tabs 420 are on the inside of the electrical box 460 with the outside facing wall 420b (seen in FIG. 82) of the tabs 420 resting against an inside surface of side 460b. In addition, an inside facing wall 412a (seen in FIG. 81) of the base 412 engages an outside surface of the side 460b to prevent the cable clamp 410 from passing through the pry-out openings in the side 460b and into the electrical box 460. With this snap-in fit, the snap-in tabs and the base releasably secure the cable clamp assembly 450 to the electrical box 460. One or more cables can then be inserted into each cable clamp 410 in a similar manner as described above with fingers 416 imparting little resistance to the forward advancement of an electrical cable within the cable clamp 410, and to engage the electrical cable imparting sufficient resistance to rearward movement of the electrical cable to prevent easy withdrawal of the electrical cable from the cable clamp 410.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical cable clamp comprising:
a base having a center opening;
a first clamp member having a first end extending from the base and a second free end;
a second clamp member having a first end extending from the base and a second free end, wherein the second free end of the first clamp member opposes the second free end of the second clamp member, wherein an area where the second free end of the first clamp member opposes the second free end of the second clamp member being a cable gripping area, and wherein the free end of the first clamp member and the free end of the second clamp member are shaped to flex imparting little resistance to advancement of a cable within the gripping area in a first direction, while imparting sufficient resistance to hold the cable in the gripping area;
at least one inside snap-in tab having a camming surface that facilitates installation of the electrical cable clamp into an opening in an electrical box from outside the electrical box; and
at least one outside snap-in tab having a camming surface that facilitates installation of the electrical cable clamp into the opening in the electrical box from inside the electrical box.

2. The electrical cable clamp according to claim 1, wherein the free end of the first clamp member and the free end of the second clamp member are shaped to impart sufficient resistance to movement of the cable in a direction opposite the first direction to prevent withdrawal of the cable from the gripping area.

3. The electrical cable clamp according to claim 1, wherein the at least one inside snap-in tab and the at least one outside snap-in tab are adapted to releasably secure the electrical cable clamp to the electrical box.

4. The electrical cable clamp according to claim 1, further comprising at least one clamp holding member extending outward from the base and positioned between the at least one outside snap-in tab and the at least one inside snap-in tab.

5. The electrical cable clamp according to claim 1, further comprising:
a first cable guide member having a first end extending from the base and a second free end; and
a second cable guide member having a first end extending from the base and a second free end, wherein the second free end of the first cable guide member and the second free end of the second cable guide member are positioned in proximity to the gripping area.

6. The electrical cable clamp according to claim 1, wherein the base is configured and dimensioned to fit within a knock-out of the electrical box.

7. The electrical cable clamp according to claim 1, wherein the base, first clamp member, second clamp member, at least one inside snap-in tab and the at least one outside snap-in tab are made of a non-metallic material.

8. The electrical cable clamp according to claim 7, wherein the non-metallic material comprises a polymeric material and a plastic material.

9. The electrical cable clamp according to claim 7, wherein the non-metallic material comprises injection molded thermoplastic.

10. An electrical cable clamp comprising:
a base having a center opening;
a first clamp member having a first end extending from the base and a second free end;
a second clamp member having a first end extending from the base and a second free end, wherein the second free end of the first clamp member opposes the second free end of the second clamp member, wherein an area where the second free end of the first clamp member opposes the second free end of the second clamp member being a cable gripping area, and wherein the free end of the first clamp member and the free end of the second clamp member are shaped to flex imparting little resistance to advancement of a cable within the gripping area in a first direction, while imparting sufficient resistance to hold the cable in the gripping area;
at least one inside snap-in tab having a camming surface that facilitates installation of the electrical cable clamp into an opening in an electrical box from outside the electrical box;
at least one outside snap-in tab having a camming surface that facilitates installation of the electrical cable clamp into the opening in the electrical box from inside the electrical box; and
at least one clamp holding member extending outward from the base and positioned between the at least one outside snap-in tab and the at least one inside snap-in tab.

11. The electrical cable clamp according to claim 10, wherein the free end of the first clamp member and the free end of the second clamp member are shaped to impart sufficient resistance to movement of the cable in a direction opposite the first direction to prevent withdrawal of the cable from the gripping area.

12. The electrical cable clamp according to claim 10, wherein the at least one inside snap-in tab and the at least one clamp holding member are adapted to releasably secure the electrical cable clamp to the electrical box when the electrical cable clamp is installed into an opening in an electrical box from outside the electrical box.

13. The electrical cable clamp according to claim 10, wherein the at least one outside snap-in tab and the at least one clamp holding member are adapted to releasably secure the electrical cable clamp to the electrical box when the electrical cable clamp is installed into an opening in the electrical box from inside the electrical box.

14. The electrical cable clamp according to claim 10, further comprising:
a first cable guide member having a first end extending from the base and a second free end; and
a second cable guide member having a first end extending from the base and a second free end, wherein the second free end of the first cable guide member and the second free end of the second cable guide member are positioned in proximity to the gripping area.

15. The electrical cable clamp according to claim 10, wherein the base is configured and dimensioned to fit within a knock-out of the electrical box.

16. The electrical cable clamp according to claim 10, wherein the base, first clamp member, second clamp member, at least one inside snap-in tab, at least one outside snap-in tab and the at least one clamp holding member are made of a non-metallic material.

17. The electrical cable clamp according to claim 16, wherein the non-metallic material comprises a polymeric material and a plastic material.

18. The electrical cable clamp according to claim 16, wherein the non-metallic material comprises injection molded thermoplastic.

19. An electrical cable clamp comprising:
a base having a center opening;

a first clamp member having a first end extending from the base and a second free end;

a second clamp member having a first end extending from the base and a second free end, wherein the second free end of the first clamp member opposes the second free end of the second clamp member, wherein an area where the second free end of the first clamp member opposes the second free end of the second clamp member being a cable gripping area, and wherein the free end of the first clamp member and the free end of the second clamp member are shaped to flex imparting little resistance to advancement of a cable within the gripping area in a first direction, while imparting sufficient resistance to hold the cable in the gripping area;

a first cable guide member having a first end extending from the base and a second free end;

a second cable guide member having a first end extending from the base and a second free end, wherein the second free end of the first cable guide member and the second free end of the second cable guide member are positioned in proximity to the gripping area;

at least one inside snap-in tab having a camming surface that facilitates installation of the electrical cable clamp into an opening in an electrical box from outside the electrical box;

at least one outside snap-in tab having a camming surface that facilitates installation of the electrical cable clamp into the opening in the electrical box from inside the electrical box; and at least one clamp holding member extending outward from the base and positioned between the at least one outside snap-in tab and the at least one inside snap-in tab.

20. The electrical cable clamp according to claim 19, wherein the free end of the first clamp member and the free end of the second clamp member are shaped to impart sufficient resistance to movement of the cable in a direction opposite the first direction to prevent withdrawal of the cable from the gripping area.

21. The electrical cable clamp according to claim 19, wherein the at least one inside snap-in tab and the at least one clamp holding member are adapted to releasably secure the electrical cable clamp to the electrical box when the electrical cable clamp is installed into an opening in an electrical box from outside the electrical box.

22. The electrical cable clamp according to claim 19, wherein the at least one outside snap-in tab and the at least one clamp holding member are adapted to releasably secure the electrical cable clamp to the electrical box when the electrical cable clamp is installed into an opening in the electrical box from inside the electrical box.

23. The electrical cable clamp according to claim 19, wherein the base is configured and dimensioned to fit within a knock-out of the electrical box.

24. The electrical cable clamp according to claim 19, wherein the base, first clamp member, second clamp member, a first cable guide member, a second cable guide member, at least one inside snap-in tab, at least one outside snap-in tab and the at least one clamp holding member are made of a non-metallic material.

25. The electrical cable clamp according to claim 24, wherein the non-metallic material comprises a polymeric material and a plastic material.

26. The electrical cable clamp according to claim 24, wherein the non-metallic material comprises injection molded thermoplastic.

\* \* \* \* \*